US009185516B2

(12) United States Patent
Fischer et al.

(10) Patent No.: US 9,185,516 B2
(45) Date of Patent: Nov. 10, 2015

(54) RADIO FREQUENCY INTERFERENCE AWARENESS ASSISTANCE DATA

(71) Applicant: QUALCOMM Incorporated, San Diego, CA (US)

(72) Inventors: Sven Fischer, Nuremberg (DE); Stephen William Edge, Escondido, CA (US)

(73) Assignee: QUALCOMM Incorporated, San Diego, CA (US)

(*) Notice: Subject to any disclaimer, the term of this patent is extended or adjusted under 35 U.S.C. 154(b) by 76 days.

(21) Appl. No.: 13/897,244

(22) Filed: May 17, 2013

(65) Prior Publication Data
US 2013/0310068 A1 Nov. 21, 2013

Related U.S. Application Data

(60) Provisional application No. 61/649,903, filed on May 21, 2012, provisional application No. 61/800,332, filed on Mar. 15, 2013.

(51) Int. Cl.
*H04W 24/00* (2009.01)
*H04W 4/02* (2009.01)
(Continued)

(52) U.S. Cl.
CPC .............. *H04W 4/02* (2013.01); *G01S 19/05* (2013.01); *G01S 19/21* (2013.01)

(58) Field of Classification Search
CPC ........... G01S 19/05; G01S 19/21; H04W 4/02
USPC ............... 455/456.1, 404.2, 420, 421, 422.1, 455/456.2, 456.3, 456.5, 456.6, 457; 370/328, 338, 329, 331, 332
See application file for complete search history.

(56) References Cited

U.S. PATENT DOCUMENTS 7,864,109 B2   1/2011   Normark et al.
8,130,141 B2   3/2012   Pattabiraman et al.
(Continued)

FOREIGN PATENT DOCUMENTS

WO   WO-2011011118 A1   1/2011

OTHER PUBLICATIONS

Partial International Search Report—PCT/US2013/042050—ISA/EPO—Oct. 18, 2013.
(Continued)

*Primary Examiner* — Babar Sarwar
(74) *Attorney, Agent, or Firm* — Kilpatrick Townsend Stockton LLP

(57) ABSTRACT

Systems, methods, apparatuses, and computer-readable media for providing radio frequency interference (RFI) awareness assistance data to global navigation satellite system (GNSS) receivers are described. In some embodiments, a first method includes receiving at a location server RFI situational information. The first method further includes maintaining at least one time and location dependent database of an RFI situation. The first method further includes sending at least one assistance data message to at least one receiver including the RFI situational information. In another embodiment, a second method includes receiving RFI awareness assistance data from a location server. The second method further includes adapting a position location measurement according to the received RFI awareness assistance data. The second method further includes calculating a location of the receiver based at least in part on the adapted position location measurement.

48 Claims, 11 Drawing Sheets

(51) Int. Cl.
*G01S 19/05* (2010.01)
*G01S 19/21* (2010.01)

(56) References Cited

U.S. PATENT DOCUMENTS

| | | |
|---|---|---|
| 8,138,975 B2 | 3/2012 | Bull et al. |
| 8,154,442 B2 | 4/2012 | Alanen et al. |
| 8,154,443 B2 | 4/2012 | Xhafa et al. |
| 2001/0050630 A1* | 12/2001 | Fujii .................. 342/357.02 |
| 2006/0234641 A1* | 10/2006 | LaGrotta .................. 455/67.13 |
| 2012/0038512 A1 | 2/2012 | Geswender et al. |

OTHER PUBLICATIONS

International Search Report and Written Opinion—PCT/US2013/042050—ISA/EPO—Feb. 26, 2014.

Trinkle et al., "GPS interference mitigation; Overview and experimental results", Proceedings of the 5th International Symposium on Satellite Navigation Technology & Applications Canberra, Australia, Menay / GPS Society, Jan. 1, 2001, pp. 1-14, XP007911320.4.

* cited by examiner

| RFI Power | RFI Power-to-Noise Ratio (J/N) | RFI PRN Code Number | RFI Frequency | RFI Location | RFI Type |
|---|---|---|---|---|---|
| -72 dBm | 7 dB | 3 | 1575.42 MHz (L1) | Cell Area 1 | Broadband |
| -75 dBm | 10 dB | 1 | 1381.05 MHz (L3) | Cell Area 2 | Narrowband |
| -83 dBm | 5 dB | 5 | 1176.45 MHz (L5) | Cell Area 3 | Matched Spectrum |

*FIG. 9*

RADIO FREQUENCY INTERFERENCE AWARENESS ASSISTANCE DATA

CROSS-REFERENCE TO RELATED APPLICATIONS

This patent application claims the benefit of U.S. Provisional Patent Application Ser. No. 61/649,903 filed May 21, 2012, and titled "RADIO FREQUENCY INTERFERENCE AWARENESS ASSISTANCE DATA," and U.S. Provisional Patent Application Ser. No. 61/800,332 filed Mar. 15, 2013, and titled "RADIO FREQUENCY INTERFERENCE AWARENESS ASSISTANCE DATA," the disclosures of which are incorporated by reference herein in their entirety for all purposes.

BACKGROUND

Aspects of the disclosure relate to wireless communications systems. In particular, aspects of the disclosure relate to systems, methods, apparatuses, and computer-readable media that provide radio frequency interference awareness assistance data for one or more Global Navigation Satellite Systems (GNSSs) to receiver devices.

Increasingly, concern about GNSS vulnerability has gained widespread attention. GNSS receivers are typically highly susceptible to various types of interference. Typical GNSS signals are of very low power and, despite being wideband spread spectrum protected, are still vulnerable to jamming GNSS signals may also be vulnerable to spoofing where the signals are intercepted and rebroadcast by a malicious device. Typically, for GNSS users and network operators, no visible signs may appear indicating why a GNSS operation has failed in a particular area and a common assumption that a reliable GNSS signal is not available is made. This assumption may disregard the true cause of the GNSS signal interference. In the case of jamming, the consequence may be an inability to locate a receiver device resulting in impaired service to users and applications (e.g. an inability to locate an emergency caller). In the case of spoofing, the consequence may be the propagation of false location information which may not only impair service to users and applications but also lead to damaging results (e.g. mislead public safety dispatch in the case of an emergency call or cause a user to navigate to an incorrect and possibly dangerous destination).

BRIEF SUMMARY

It is well known in the art that interference detection algorithms have been described based on observable statistical behavior of various types of interference on certain GNSS receiver observables. All these interference detection methods have in common that they require new hardware and/or software functionality in the GNSS receiver. However, in the case of GNSS location for mobile wireless devices such as cellphones and smartphones, not all GNSS capable receivers (mobile devices) in a wireless operator's network may be capable of interference detection. In addition, the process to detect and characterize the interference may be time consuming, increasing the overall response time of the mobile device in general.

These problems and others may be solved according to embodiments of the present invention, described herein. Embodiments of the invention solve problems associated with detecting the presence of interference at a GNSS receiver. Embodiments of the invention provide improved techniques to address these problems. Aspects of the disclosure provide more convenient, intuitive, and functional ways of detecting the presence of interference at a GNSS receiver.

If GNSS receivers are aware a-priori about a radio frequency interference situation, the step of interference detection would not be needed, simplifying receiver implementations and reducing overall response times.

Systems, methods, apparatuses, and computer-readable media for providing radio frequency interference (RFI) awareness assistance data to GNSS receivers are described. RFI awareness assistance data may include information about the interference situation in a particular geographical area, such as RFI's time, frequency characteristics and power. This information may advise the GNSS receiver to use particular algorithms to cope with the level of interference; e.g., use of a particular deep-search strategy, or use of receive diversity, or use of other (unaffected) GNSS signals, or use of other (unaffected) GNSSs etc. In certain cases, the RFI awareness assistance data may also advise the receiver not to use GNSS for position location at all, but use instead other non-GNSS methods for position location that have been standardized and deployed such as Observed Time Difference of Arrival (OTDOA), Advanced Forward Link Trilateration (AFLT) or Enhanced Cell-ID (ECID) positioning.

In some embodiments, a method includes receiving at a location server radio frequency interference (RFI) situational information. The method may further include maintaining at least one time and location dependent database of an RFI situation. The method may further include sending at least one assistance data message to at least one receiver including the RFI situational information.

In some embodiments, the RFI situational information comprises information about time and frequency characteristics of the RFI, power of the RFI, power-to-noise ratio of the RFI, or a PRN code number of the RFI.

In some embodiments, the assistance data message comprises one or more indications about changes in the RFI situation and indications about a presence of spoofing.

In some embodiments, the RFI situational information is received by a location server from one or more interference monitoring devices.

In some embodiments, the method further includes broadcasting the RFI situational information to a plurality of receivers.

In some embodiments, the method further includes sending a location request to the receiver.

In some embodiments, the assistance data comprises a message defined according to one of Secure User Plane Location (SUPL) solution, the Radio Resource Location Services Protocol (RRLP), the Radio Resource Control (RRC) protocol, the Long Term Evolution Positioning Protocol (LPP), the LPP Extensions (LPPe) protocol or IS-801.

In some embodiments, a method includes receiving RFI awareness assistance data from a location server. The method may further include adapting a position location measurement according to the received RFI awareness assistance data. The method may further include calculating a location of the receiver based at least in part on the adapted position location measurement.

In some embodiments, the adapting further includes analyzing the received RFI awareness assistance data and adapting a signal(s) acquisition method based at least in part on the analyzing. The adapting may further include acquiring the signal(s) based on the signal acquisition method and extracting information relevant to calculating the location.

In some embodiments, adapting the signal(s) acquisition method further includes selecting a GNSS frequency band, employing an algorithm(s) to mitigate RFI, acquiring a GNSS signal without interference, or acquiring a non-GNSS based signal.

In some embodiments, the RFI awareness assistance data comprises RFI situational information comprising information about time and frequency characteristics of the RFI, power of the RFI, power-to-noise ratio of the RFI, or a PRN code number of the RFI.

In some embodiments, the RFI awareness assistance data is received by a receiver device.

In some embodiments, the method may further include responding to a location request by a location server.

In some embodiments, an apparatus includes a time and location dependent database of an RFI situation and a processor coupled to the database. The processor may be configured to receive RFI situational information. The processor may also be configured to maintain the time and location dependent database. The processor may also be configured to send at least one assistance data message to at least one receiver including the RFI situational information.

In some embodiments, an apparatus includes means for receiving RFI situational information. The apparatus may further include means for maintaining at least one time and location dependent database of an RFI situation. The apparatus may further include means for sending at least one assistance data message to at least one receiver including the RFI situational information.

In some embodiments, a computer program product residing on a processor-readable medium and comprising processor-readable instructions is configured to cause a processor to receive radio frequency interference (RFI) situational information. The processor-readable instructions may further be configured to maintain at least one time and location dependent database of an RFI situation. The processor-readable instructions may further be configured to send at least one assistance data message to at least one receiver including the RFI situational information.

In some embodiments, an apparatus includes a GNSS receiver configured to receive a GNSS signal. The apparatus may further include a processor coupled to the GNSS receiver. The processor may be configured to receive RFI awareness assistance data from a location server. The processor may further be configured to adapt a position location measurement according to the received RFI awareness assistance data. The processor may further be configured to calculate a location of the receiver based at least in part on the adapted position location measurement.

In some embodiments, an apparatus includes means for receiving RFI awareness assistance data from a location server. The apparatus may further include means for adapting a position location measurement according to the received RFI awareness assistance data. The apparatus may further include means for calculating a location of the receiver based at least in part on the adapted position location measurement.

In some embodiments, a computer program product residing on a processor-readable medium and comprising processor-readable instructions are configured to cause a processor to receive RFI awareness assistance data from a location server. The instructions may be further configured to cause a processor to adapt a position location measurement according to the received RFI awareness assistance data. The instructions may be further configured to cause a processor to calculate a location of the receiver based at least in part on the adapted position location measurement.

In some embodiments, a method of supporting location of mobile devices includes detecting RFI for at least one GNSS system at a GNSS receiver and sending RFI situational information to a location server.

In some embodiments, the RFI situational information is sent in response to a location request from the location server. The RFI situational information is sent periodically or when an RFI signal level exceeds a threshold.

In some embodiments, the RFI situational information is sent in a message defined according to Secure User Plane Location (SUPL), Radio Resource Location Services Protocol (RRLP), Radio Resource Control (RRC), LTE Positioning Protocol (LPP), LPP Extensions (LPPe), IS-801, or LPP A (LPPa).

In some embodiments, the GNSS receiver is a mobile device, base station, or femto cell.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 9 illustrates exemplary RFI awareness assistance data packet according to some embodiments.

DETAILED DESCRIPTION

Figure 1:
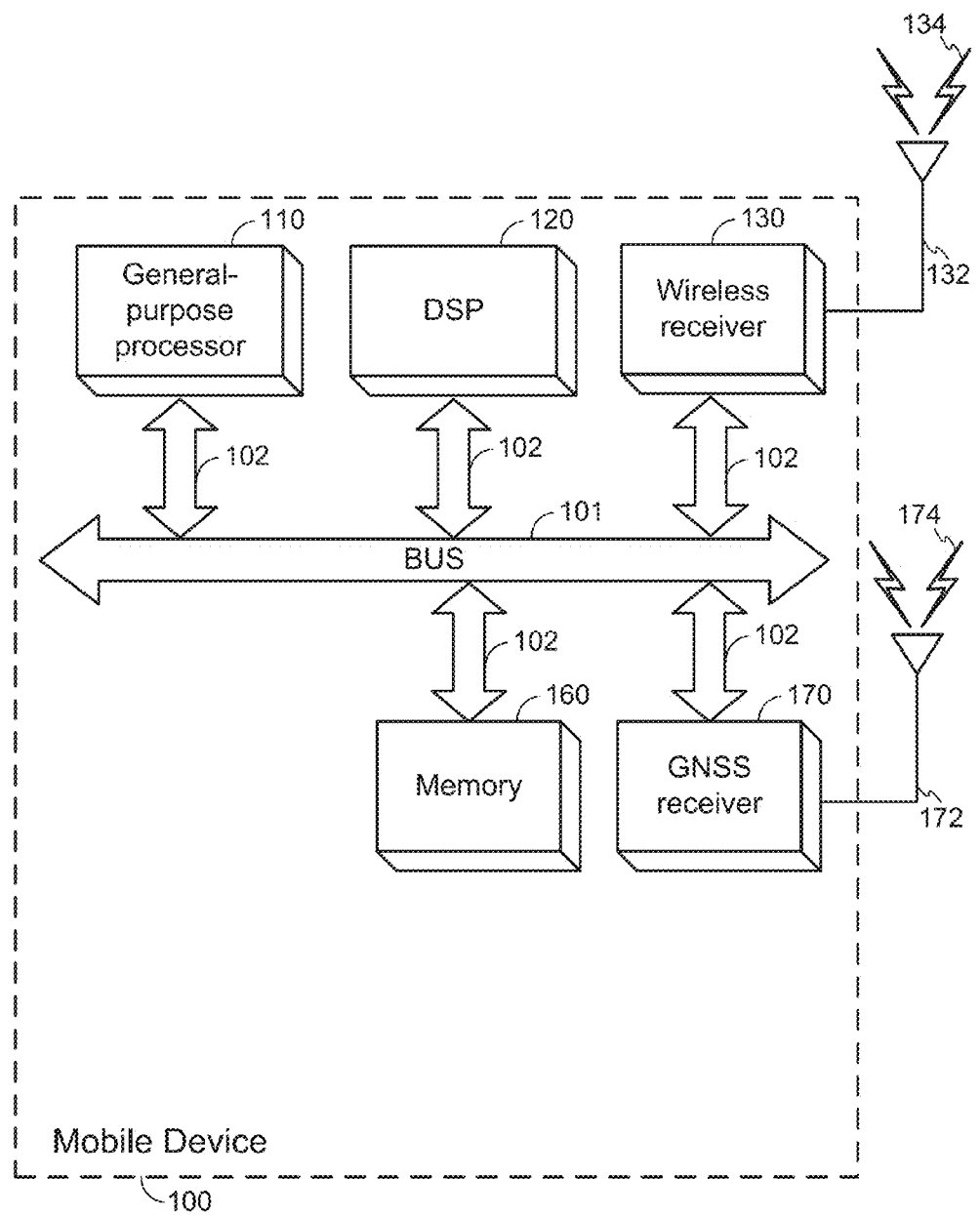
FIG. 1 is a block diagram illustrating an exemplary mobile device according to some embodiments.

The word "exemplary" is used herein to mean "serving as an example, instance, or illustration." Any embodiment or design described herein as "exemplary" is not necessarily to be construed as preferred or advantageous over other embodiments or designs.

The techniques described herein may be used for supporting location of mobile devices by various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Time Division Synchronous Code Division Multiple Access (TD-SCDMA), Universal Terrestrial Radio Access (UTRA), CDMA2000, etc. UTRA includes Wideband-CDMA (W-CDMA) and Low Chip Rate (LCR). CDMA2000 covers IS-2000, High Rate Packet Data (HRPD), IS-95 and IS-856 standards. A TDMA network may implement a radio technology such as Global System for Mobile Communications (GSM). An FDMA network may include Universal Mobile Telecommunications System-frequency-division duplexing (UMTS-FDD) and the like. An OFDMA network may implement a radio technology such as Evolved UTRA (E-UTRA), IEEE 802.11, IEEE 802.16, IEEE 802.20, Flash-OFDM®, etc. UTRA is part of Universal Mobile Telecommunication System (UMTS). Long Term Evolution (LTE) is a radio technology used by E-UTRA. UTRA, E-UTRA, GSM, UMTS and LTE are described in publicly available documents from an organization named "3rd Generation Partnership Project" (3GPP). CDMA2000 is described in documents from an organization named "3rd Generation Partnership Project 2" (3GPP2). These various radio technologies and standards are known in the art.

Concern about Global Navigation Satellite System (GNSS) vulnerability has received a great deal of attention recently. GNSS receivers are highly susceptible to jamming and spoofing. Historically, signal jamming and the design of equipment to protect against it has been considered primarily a military problem. Now, however, signal jamming threatens all GNSS receivers, military and civilian. Typical GNSS signals are of very low power and, despite being wideband spread spectrum protected, are still vulnerable to quite crude jamming.

For example, in-car GNSS jammers, openly advertised online as "Personal Privacy Protection Devices," constitute a serious threat to safety critical GNSS applications, such as E911 in North America, E112 in Europe and in-vehicle emergency services (eCall) in Europe and elsewhere. Such jammers are relatively easy to purchase over the Internet and to operate by plugging into the cigarette lighter of a vehicle. While users of such equipment are concerned only with the jamming of GNSS devices on a particular single vehicle (typically the vehicle to which the jammer is attached), the area affected by that jamming signal can be quite large. For example, a simple 10 milliwatt (mW) jammer may prevent GNSS signal acquisition at a location kilometers away from the jammer. As such, other GNSS receivers in the vicinity of the jammer's range may not be able to successfully use a GNSS signal for location determination.

Spoofing, on the other hand is a more pernicious form of attack, with meaconing being a particularly pernicious variant thereof, implemented by the interception and rebroadcast of GNSS signals. Civilian GNSS signals are relatively easy to spoof because the spread spectrum codes, modulation etc. are open to the public. Spoofing attacks may range from simplistic attacks to sophisticated attacks. There are various spoofing detection methods that may be well known in the art, e.g., monitoring the absolute power for each carrier and setting maximum power in the GNSS receiver, monitoring the relative received signal power, Doppler shift checking, codeless cross correlation of L1 and L2 channels which would generate a peak for genuine signals, comparing decoded ephemeris data with known non-spoofed ephemeris data, and jump detection.

For GNSS users and network operators, usually no visible signs are present for indicating reasons as to why GNSS operation has failed in a particular area. Accordingly, the usual assumption may be that the GNSS device is located deep indoors or in a dense urban canyon, and thus, GNSS signals are probably unavailable. However, if the GNSS receiver or network operator is aware of jamming/spoofing incidents in a particular area, the receiver could be advised not to use GNSS for location determination, or the GNSS receiver may use appropriate algorithms that attempt to mitigate the interference. For example, if the GNSS receiver is advised that a certain level of inband interference is present in a particular area, the GNSS receiver may adapt its search strategy accordingly, e.g., increase the total search time.

In general, it is useful to know whether the GNSS signal is disturbed or jammed in order to determine whether or not the GNSS data is reliable, or to select appropriate receiver algorithms to mitigate the inband interference (e.g., increase the search time, possibly in addition to data wipe-off (sensitivity assistance)), or to use another unaffected GNSS signal, or to use a different unaffected GNSS, or not use GNSS at all for the location determination method in the particular situation.

Various methods are described in the literature to detect at a GNSS receiver the presence of interference. The detection can take place inside the radio frequency (RF) front end or at the base-band block of the GNSS receiver. Detecting the interference and then characterizing it can lead to its removal. For example, knowledge about the time specification, frequency, and power of the interference can be useful in selecting appropriate algorithms to mitigate impacts of the interference. In the RF front end, inband interference affects many of the components and these effects can be exploited for the purpose of interference detection. In particular the Automatic Gain Control (AGC) has been used for interference detection. The gain varies with respect to the interference power present and is therefore a valuable tool to detect it. In an example, a mobile device may detect RFI at a certain location and record the location information in a local database. The recorded RFI location information may be forwarded to a base station or location server. The base station or location server may crowd-source RFI location information from a number of mobile devices.

Radio frequency interference also affects the components in the base-band block of the GNSS receiver by affecting acquisition and tracking loops. It is well known in the art that interference detection algorithms have been described based on observable statistical behavior of various types of interference on the GNSS receiver observables. All these interference detection methods have in common that they require new hardware and/or software functionality in the GNSS receiver. However, not all GNSS capable receivers (e.g., within a mobile device) in an operator's network may be capable of interference detection. In addition, the process to detect and characterize the interference may be time consuming, increasing the overall response time of the mobile device in general.

If GNSS receivers are aware a-priori about the radio frequency interference situation, the step of interference detection would not be needed, simplifying receiver implementations and reducing overall response times. For example, if the GNSS receiver is using the US Global Positioning System (GPS) for location and is aware that the GPS L1 frequency band is being jammed, the receiver may not try at all to acquire the GPS L1 signal, but use instead the GPS L2 or L5 signals for acquisition and location determination. As another example, if the GNSS receiver is aware that all the GPS frequency bands are being jammed, the GNSS receiver may not use the GPS system at all, but use another GNSS positioning system, such as for example, the Russian Globalnaya Navigatsionnaya Sputnikovaya Sistema (GLONASS) system, the Chinese Beidou system or the European Galileo system for location determination.

The operator's network may include base stations equipped with GNSS receivers for providing timing services for normal network operation. CDMA base stations for example are usually equipped with GPS receivers, but also LTE base stations may be synchronized to a common GNSS time. As such, the GNSS receivers at the base station may not only provide timing information and services, but may also be used to gather radio frequency interference situational information. For example, the GNSS receivers at the base station may be capable of detecting radio frequency interference and determining its characteristics, such as time and frequency distribution and power. The GNSS receivers at the base stations may continuously perform this operation and report to a location server the radio frequency situational information. The location server may use this information to aggregate a location and time dependent "map" database of the RFI situation within the network.

GNSS receivers may be further supported by femto cells which are small base stations, sometimes known as home base stations or small cells, that support a small coverage area such as a home, office or part of a building or venue and that are typically installed by users and not by a network operator. A GNSS receiver may be essential to femto cell operation, regardless of the radio technology that it supports, in order to locate the femto cell and verify that the femto cell location corresponds to an area in which the associated network operator is licensed to use certain spectrum. Such femto cell GNSS receivers may then be further augmented to detect and report on local RFI. It should be noted that for some radio technologies (e.g. GSM, WCDMA and in some cases LTE) femto cell operation may not be impaired by RFI once the femto cell has obtained its own location—e.g. prior to the onset of any RFI. Hence, in contrast to some base stations whose operation may be impaired by RFI over a period of time to a point where a base station may need to be shut down by an operator in an extreme case, a femto cell may continue to operate correctly and be enabled to report on RFI over an indefinite period. A further advantage of supporting RFI reporting from femto cells is the potential very dense deployment of femto cells that may occur (e.g. in urban and suburban areas) in order to enhance network operator capacity and coverage. This may enable multiple RFI reports from different femto cells at different locations when a jamming or spoofing source is nearby making it easier to detect the location of the jamming or spoofing source and/or accurately predict the effective RFI for other locations such as the location of some mobile device.

The "map" of the RFI situation may be stored within a database residing in the location server. The "map" may include cell locations, service area locations or particular location coordinates within a wireless communication environment and the corresponding RFI situation for each location. In some embodiments the "map" may be 2-dimensional. In other embodiments, the "map" may have more dimensions (e.g. may store an RFI situation for different floors of a tall building). The "map" or one or more tiles of the "map" may be sent to a GNSS receiver as described below.

The interference monitoring devices may not need to be deployed at base stations and femto cells as described above. However, since GNSS receivers may be needed at base stations and femto cells in any case, the additional interference monitoring functionality may be straight forward to include at the base stations' or femto cells' GNSS receivers. Other possibilities may include the use of dedicated, stand-alone, interference monitoring devices, or including the interference monitoring function in the Wide Area Reference Network (WARN) or in IEEE 802.11 WiFi Access Points (APs) or in Location Measurement Units (LMUs) which may be separate logical or physical entities containing a GNSS receiver and deployed by a network operator (e.g. collocated with base stations) to support various non-GNSS terrestrial position methods such as Uplink Time Difference of Arrival (U-TDOA) in a GSM, WCDMA or LTE network.

The radio frequency interference situational information may also be provided by mobile stations in the network, which are capable of detecting radio frequency interference. The mobile stations may regularly report, or report on request, the RFI situation to a location server. Alternatively or in addition, a mobile station may report the RFI situation when requested by a location server or other server to provide (i) location (e.g. GNSS) measurements or (ii) a location estimate to the server or (iii) some other type of information such as measurements of RF conditions used by an operator to assist with network planning and optimization (e.g. for so called "Minimization of Drive Tests" (MDT) or "Self Organizing Networks" (SON)). In this case, RFI reporting would be additional to supporting location or other features similar to MDT or SON.

When informed by mobile stations, base stations, femto cells and/or LMUs about RFI conditions, a location server may then (e.g. as part of the normal assistance data message to assist GNSS location) send the radio frequency interference awareness assistance data to a mobile device. This assistance data may include information about the radio frequency interference situation in the particular area, such as time behavior, frequency distribution, and power. The radio frequency interference awareness assistance data may also characterize a particular spoofing event in the area, such as e.g., pseudorandom noise (PRN) codes used by a potential spoofer in the area. Alternatively, a location server may cause the same RFI information (or a subset) to be broadcast to mobile stations in (and possibly outside of) the affected areas—e.g. using Evolved Multimedia Broadcast/Multicast Service (eM-BMS) or System Information block broadcast. The mobile station may then take the radio frequency interference awareness assistance data into account when acquiring GNSS signals. For example, if the interference power is relatively low, the GNSS receiver may be prepared to adjust the search strategy accordingly. If the GNSS receiver is multi-frequency capable, and the radio frequency interference awareness assistance data indicates that there is radio interference present on the e.g., GPS L1 band, the GNSS receiver may use the e.g., GPS L2 signal for acquisition, etc.

The RFI assistance data sent by a location server to a mobile device may be included as part of the assistance data used to support Assisted GNSS (A-GNSS) positioning according to standard positioning protocols such as Radio Resource Location Services Protocol (RRLP), Radio Resource Control (RRC), LTE Positioning Protocol (LPP), LPP Extensions (LPPe) and/or IS.801. RRLP, RRC and LPP are protocols defined by 3GPP in technical specifications (TSs) 44.031, 25.331 and 36.331, respectively. LPPe is defined by the Open Mobile Alliance (OMA) in TSs OMA-TS-LPPe-V1_0 and OMA-TS-LPPe-V1_1 and IS.801 is defined by 3GPP2 in TS C.S0022. The assistance data may also be included in location messages defined for the Secure User Plane Location (SUPL) solution defined by OMA either as SUPL defined parameters or within RRLP, RRC, LPP, LPPe and/or IS-801 positioning protocol messages transferred within SUPL messages. Similarly, information on local RFI conditions may be provided to a location server by a mobile device, femto cell, LMU or base station using messages defined according to SUPL, RRLP, RRC, LPP, LPPe and/or IS-801. In this context and/or in others, a location server may function as (i) an OMA defined SUPL Location Platform (SLP), (ii) a 3GPP defined Serving Mobile Location Center (SMLC), enhanced SMLC (E-SMLC) or Standalone SMLC (SAS) or (iii) a 3GPP2 defined Position Determining Entity (PDE).

In receiving RFI reports from RFI sources such as mobile devices, femto cells, LMUs and/or base stations, a location server may need to agregate and combine data over a geographic area and/or over a period of time. For example, RFI data from multiple RFI sources in the same localized area (e.g. of several kilometers across or less) may indicate jamming or spoofing from a common single device or from multiple devices. In the former case, a location server may use RFI reports to estimate the current location and possible movement of the jamming/spoofing source, its transmission power and the GNSS systems and signals being impacted. The location server may then infer the level of jamming/spoofing (e.g. signal power) that would be received at a particular approximate location of a mobile device to which RFI related assistance data is to be sent. If received RFI reports are more consistent with multiple jammers or spoofers, a location server may instead approximate the combined affect by extrapolating and/or interpolating RFI reports to other locations without attempting to pinpoint the location of any particular jammer or spoofer. A location server may also disregard RFI reports from a small number of sources A if a much larger number of sources B nearby to those in A are not reporting RFI or may conclude that any jamming/spoofing is extremely localized to the RFI reporting sources A and is not a threat to most mobile devices. This action may enable a location server to avoid sending false or inaccurate RFI assistance data to mobile devices when a small number of RFI reporting sources are faulty or have been tampered with (e.g. are spoofing false RFI reports to a location server).

The operator of a location server that receives RFI reports from multiple sources may also have an arrangement with certain authorities (e.g. police, civil and military airspace control) to provide information on RFI detection and help enable apprehension of the responsible parties and disablement of the RFI.

FIG. 1 is a block diagram illustrating an exemplary mobile device 100 according to some embodiments. The mobile device 100 may include a GNSS receiver 170 capable of receiving GNSS signals 174 via a GNSS antenna 172 coupled to the GNSS receiver 170. The GNSS receiver 170 may also process, in whole or in part, the GNSS radio signals 174 and use the GNSS signals 174 to determine the location of the mobile device 100. In some embodiments, general-purpose processor(s) 110, memory 160, DSP(s) 120, and specialized processors (not shown) may also be utilized to process the GNSS signals 174, in whole or in part, and/or calculate the location of the mobile device 100, in conjunction with GNSS receiver 170. The storage of GNSS or other location signals may be done in memory 160 or other registers (not shown).

The mobile device 100 may include DSP(s) 120 connected to a bus 101 by a bus interface 102, general-purpose processor(s) 110 connected to the bus 101 by a bus interface 102, and memory 160 connected to the bus 101 by a bus interface 102. The bus interfaces 102 may be integrated with the DSP(s) 120, general-purpose processor(s) 110, and memory 160 with which they are associated. In various embodiments, functions may be stored as one or more instructions or code in memory 160, such as on a computer-readable storage medium, such as RAM, ROM, FLASH, or disc drive, and executed by general-purpose processor(s) 110, specialized processors, or DSP(s) 120. Memory 160 may be a processor-readable memory and/or a computer-readable memory that stores software code (programming code, instructions, etc.) configured to cause the general-purpose processor(s) 110 and/or DSP(s) 120 to perform the functions described. In other embodiments, the functions described may be performed in hardware.

In some embodiments, the mobile device 100 may also include a wireless receiver 130 connected to the bus 101 by a bus interface 102. The wireless receiver 130 may be operable to receive a wireless signal 134 via antenna 132. The wireless signal 134 may be transmitted via a wireless network. In some embodiments, the wireless network may be any wireless network such as, but not limited to, the Internet, a Personal Access Network (PAN), or a cellular network (e.g. a GSM, WCDMA, LTE, CDMA2000 network). In some embodiments, antennas 132 and 174 may be the same antenna.

The mobile device 100 may be a cellphone, smartphone. PDA, tablet, laptop, tracking device or some other wireless supportable and moveable device and may be referred to as a mobile terminal, mobile station (MS), terminal, device, wireless device, user equipment (UE), SUPL Enabled Terminal (SET), target device, target or by some other name. The location of mobile device 100 may be referred to as a location estimate, position or position estimate and the operation whereby the location is obtained may be referred to as location, locating, positioning or by some other name.

Figure 2A:
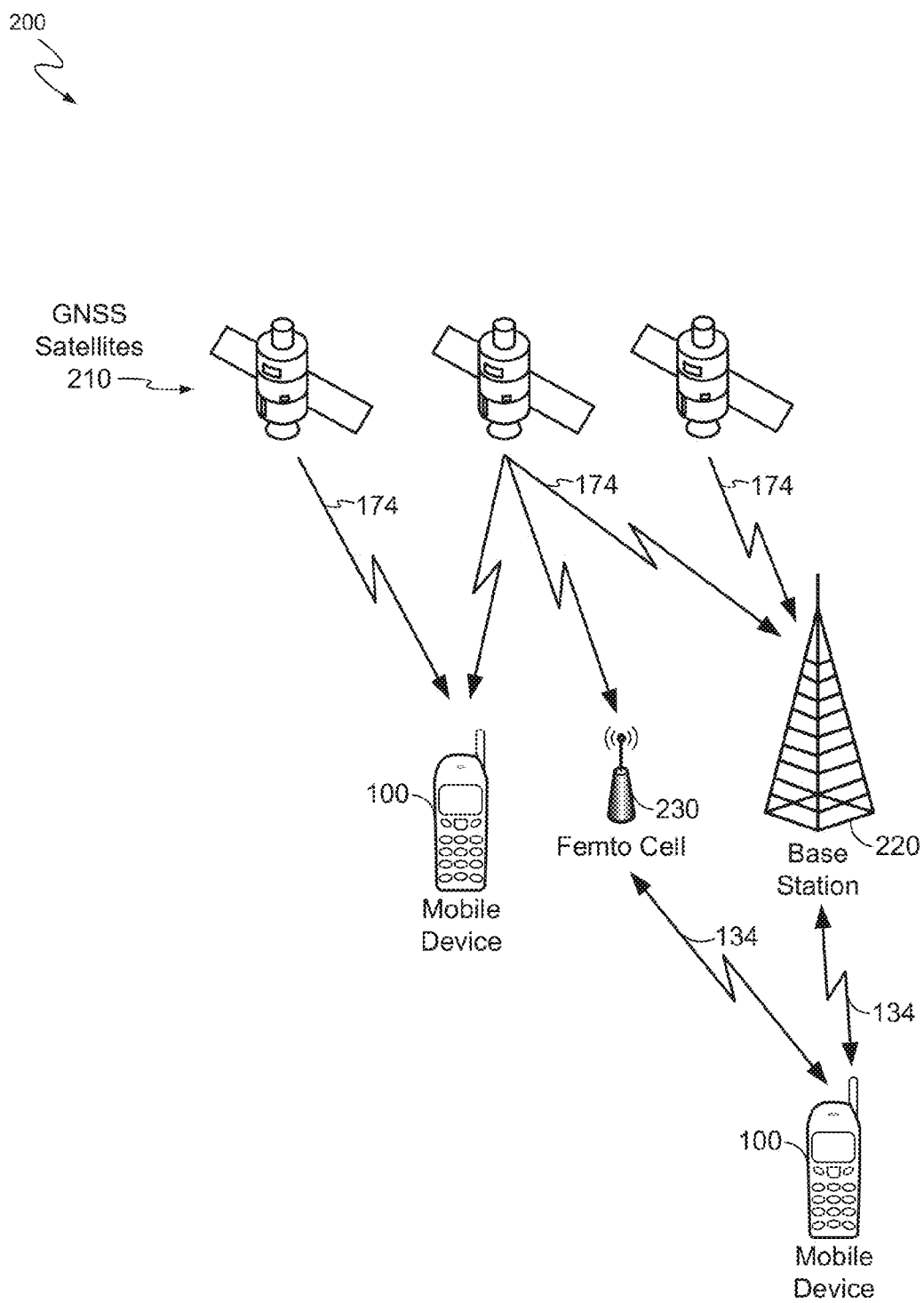
FIG. 2A illustrates an exemplary wireless communication environment according to embodiments of the present invention.

FIG. 2A illustrates an exemplary wireless communication environment 200 according to some embodiments. The wireless communication environment 200 may include a number of GNSS satellites 210 and one or more mobile devices 100. As described in FIG. 1, the mobile device 100 may include a GNSS receiver 170 (FIG. 1) operable to receive a GNSS signal 174 via a GNSS antenna 172 (FIG. 1). The GNSS signal 174 may be used by the mobile device 100 for location determination.

It can be appreciated that the GNSS satellites 210 may be any GNSS such as, but not limited to, GPS, Galileo, GLONASS, the Indian Regional Navigational Satellite System (IRNSS), or Beidou. In some embodiments, a combination of satellites from different GNSS constellations may be used.

The wireless communication environment may also include one or more base stations 220 and/or one or more femto cells 230. The base station 220 and/or femto cell 230 may also include a GNSS receiver (not shown) operable to receive a GNSS signal from the GNSS satellites 210. The base station 220 and/or femto cell 230 may communicate with a mobile device 100 via a wireless signal 134. Wireless signal 134 may conform to the GSM, WCDMA, LTE, or CDMA2000 standard or to some other wireless standard. In some embodiments, the base station 220 and/or femto cell 230 may reside within a cellular network and the wireless signal 134 may be a cellular signal. The mobile device 100 may use the wireless signal 134 for location determination.

Base station 220 may be referred to as an eNode B, Node B, Base Transceiver Station (BTS) or by some other name. Femto cell 230 may be referred to as a Home NodeB (HNB) or Home eNode B (HeNB).

Figure 2B:
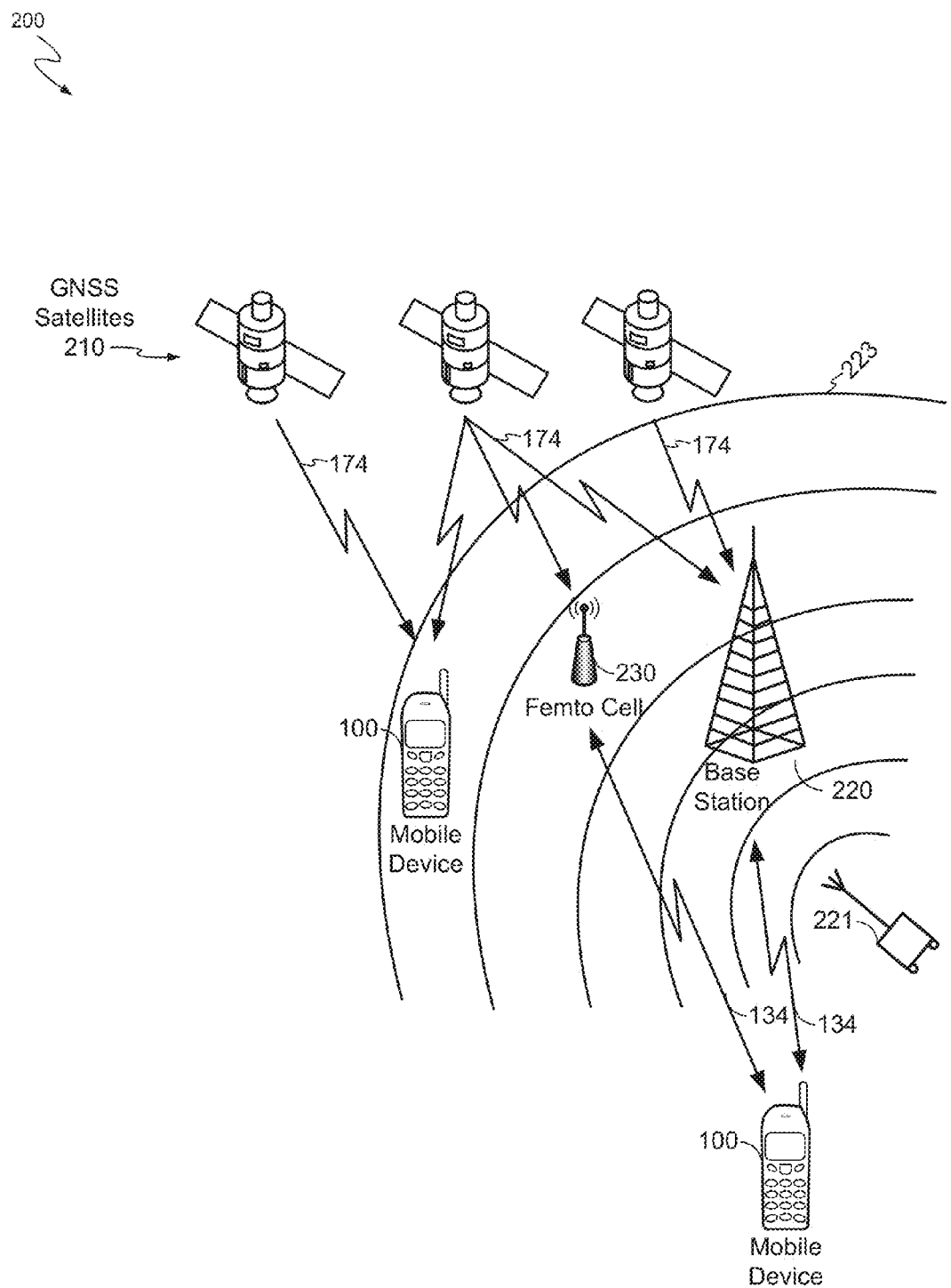
FIG. 2B illustrates an exemplary scenario of RFI transmitted by a jammer affecting a wireless communication environment according to some embodiments.

FIG. 2B illustrates an exemplary scenario of RFI 223 transmitted by jammer 221 affecting a wireless communication environment 200 according to some embodiments. As mentioned above, mobile devices 100, base station 220 and/or femto cell 230 may receive GNSS signals 174 from the GNSS satellites 210. However, the mobile devices 100, base station 220 and/or femto cell 230 may experience RFI 223 transmitted by jammer 221. Jammer 221 may transmit different types of RFI including, but not limited to, broadband, narrowband, continuous wave (CW) tone, pulsed interference with a certain duty cycle, band limited white noise, and matched spectrum. Narrowband interference can be modeled as a continuous wave at a specified frequency. Broadband interference may have a flat power spectral density over a wide range of frequencies. Pulsed interference may be characterized by a pulse duty cycle.

Efficient jammers make use of spread spectrum GNSS codes and GNSS code-chipping rates. With this approach, the power spectrum of the jammer 221 may match with the power spectrum of the GNSS signals 174. In general, mobile devices 100, base station 220 and/or femto cell 230 may not be able to acquire a GNSS signal 174 due to the RFI transmitted by the jammer 221. Mobile devices 100, base station 220 and/or femto cell 230 also may not properly communicate via wireless signals 134 due to the RFI transmitted by the jammer 221. As shown in FIG. 2B, the RFI 223 may be such that it falls within and affects the range of the mobile devices 100, base station 220 and/or femto cell 230. Thus, as mentioned above, a common assumption may be made that a reliable GNSS signal is not available rather than attributing the failure to acquire a GNSS signal to the jammer 221.

Thus, in some embodiments, the effects of RFI 223 on GNSS signal 174 acquisition and communications via wireless signals 134 may be mitigated or avoided using novel techniques presented herein.

Figure 3:
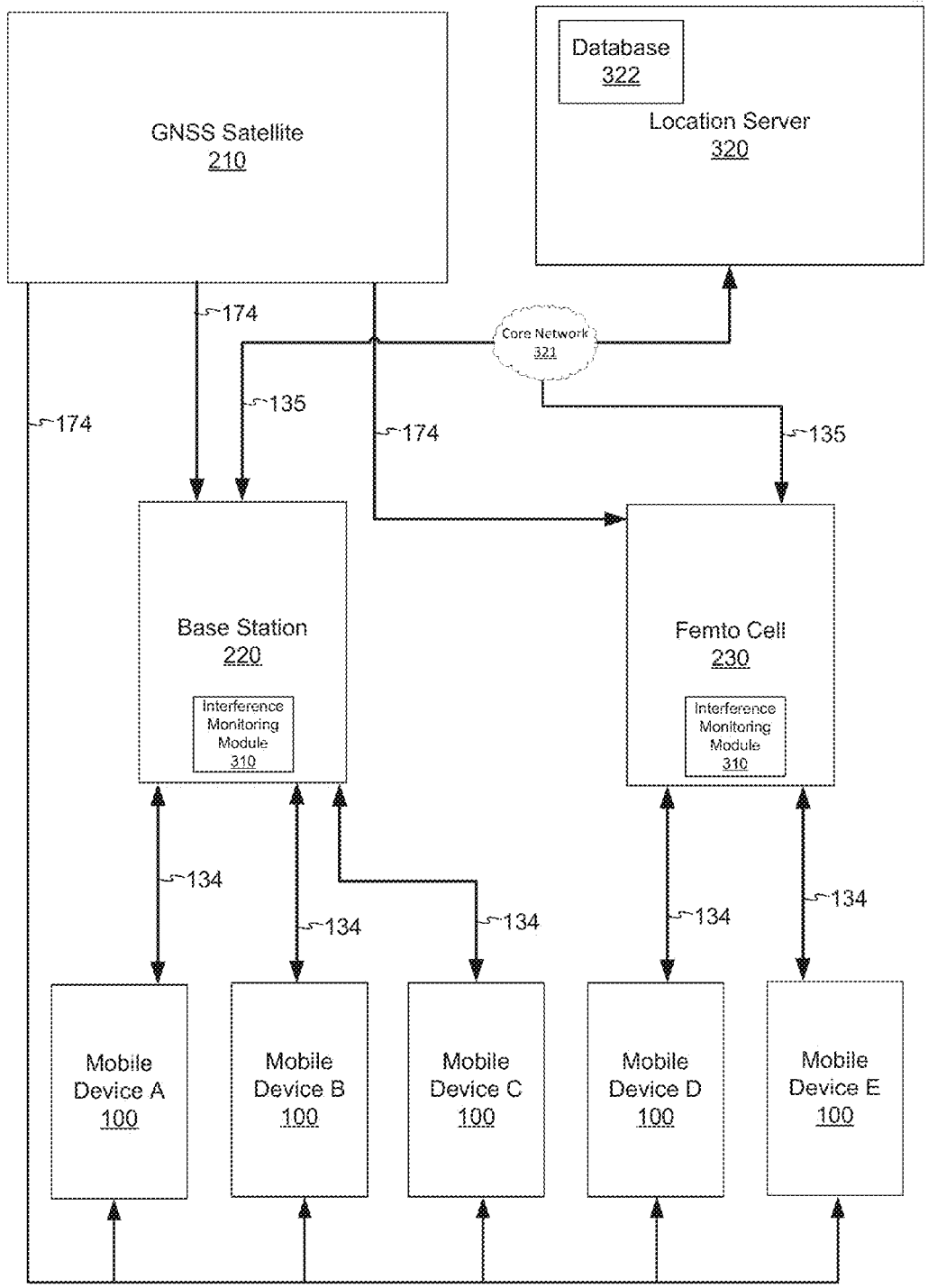
FIG. 3 is a block diagram illustrating an exemplary wireless communication environment wherein a plurality of base stations gather RFI awareness assistance data according to some embodiments.

FIG. 3 is a block diagram illustrating an exemplary wireless communication environment wherein a plurality of base stations 220 and femto cells 230 gather RFI awareness assistance data according to some embodiments. The wireless communication environment includes one or more GNSS satellites 210, one or more base stations 220, one or more femto cells 230, one or more mobile devices 100, one or more location servers 320, and other network elements (not shown) as required for the communications network. The base stations 220 and femto cells 230 may receive GNSS signals 174 from the GNSS satellite 210 via a GNSS receiver (not shown) internal to the base stations 220 and femto cells 230. The base stations 220 and femto cells 230 may also receive and transmit network signals 135 via a core network 321. The core network 321 is configured to allow communication between the base stations 220 and the location server 320 and between the femto cells 230 and the location server 320. The mobile devices 100 may receive and transmit wireless signals 134 to/from the base stations 220 and/or to/from the femto cells 230 via a wireless receiver (not shown) internal to the mobile devices 100, and may receive GNSS signals 174 from GNSS satellites 210 via a GNSS receiver (not shown) internal to the mobile device. The mobile devices 100 may communicate with the base stations 220 and/or femto cells 130 via wireless signals 134 and use the GNSS signals 174 for location determination. In some embodiments, the mobile devices 100 may use GNSS signals 174 as well as wireless signals 134 for location determination. However, while attempting to determine its location, the mobile devices 100 may encounter RFI.

In some embodiments, the location server 320 may include a database 322 operable for storing location and time dependent RFI situational information of the wireless communication environment. Using the location and time dependent RFI situational information of the wireless communication environment, the location server 320 may store a "map" of the RFI situation within the network coverage area.

The "map" of the RFI situation may be stored within a database residing in the location server. The "map" may include cell locations, service area locations and/or geographic location coordinates within a wireless communication environment and the corresponding RFI situation for each location. In some embodiments the "map" may be 2-dimensional. In other embodiments, the "map" may have more dimensions (e.g. may contain an altitude dimension). The "map" or a part of the "map" may be sent to a mobile device 100 within an assistance data message.

In some embodiments, the base stations 220 and/or femto cells 230 may include an interference monitoring module 310. The interference monitoring module 310 may be operable to monitor RFI within the wireless communication environment and gather the RFI situational information. In some embodiments, the interference monitoring module 310 may be internal to the GNSS receiver (not shown) within the base station 220 and/or femto cell 230. The base stations 220 and/or femto cells 230 may report the RFI situational information to the location server 320 and may include in each RFI report the level and type of RFI detected (e.g. time and frequency characteristics, frequency or frequency band, received signal power or signal-to-noise ratio, spoofing signal information (e.g., PRN code of a spoofer)), the identity of the reporting base station or femto cell, the location coordinates of the reporting base station or femto cell and/or cell ID(s) served by the reporting base station or femto cell. In some embodiments, this may occur upon request for the RFI situational information by the location server 320. In other embodiments, the base stations 220 and/or femto cells 230 may report the RFI situational information to the location server 320 at a predetermined periodic time interval (e.g. as configured at an earlier time by location server 320 or by a network management entity (not shown in FIG. 3)) and/or when the level of detected RFI exceeds some threshold. In some embodiments (e.g. where LTE is supported by base stations 220 and/or by femto cells 230), the RFI situational information may be reported to location server 320 by base stations 220 and/or by femto cells 230 using messages defined according to the LTE Positioning Protocol A (LPPa) defined by 3GPP in TS 36.455.

The mobile devices 100 may communicate with the location server 320 via base stations 220 and/or femto cells 230 and/or via other network elements (not shown), such as Radio Network Controller (RNC), Mobile Switching Centers (MSC), Serving GPRS Support Nodes (SGSN), Mobility Management Entities (MME), or other network elements that may be dependent on communications network 321. The location server 320 may provide the mobile devices 100 with RFI situational information from the time and location dependent database 322 for the wireless communication environment. By using the RFI situational information provided, the mobile devices 100 may adapt a position location measurement according to the received RFI situational information prior to calculating a location of the mobile device.

It should be understood that while FIG. 3 shows RFI situational information as being provided by mobile devices 100, base stations 220 and/or femto cells 230 to location server 320, in some embodiments, RFI situational information may be provided to other entities instead of in addition to location server 320, such as to base stations 220, femto cells 230, core network 321 or servers associated with support of SON or MDT, In such a case, these other recipient entities may transfer RFI situational information to location server 320 and/or may perform some or all of the actions described elsewhere herein for location server 320—e.g. may store a database 322 of RFI locational information and provide RFI assistance to mobile devices 100.

It may also be understood that while FIG. 3 exemplies RFI situational information being provided for GNSS signal acquisition and measurement, RFI situational information may also be detected and provided (e.g. by mobile devices 100, base stations 220 and/or femto cells 230) related to jamming or spoofing or wireless communication signals—e.g. wireless signals 134 used for communication between mobile stations 100 and base stations 220 and/or femto cells 230. In such a case, mobile stations 100, base stations 220 and/or femto cells 230 may provide RFI situational information to location server 320 or to some other entity (e.g. an entity in core network 321). The RFI situational information may be used to reconfigure some base stations 220 and/or some femto cells 230 to use frequencies for wireless signals 134 that are not subject to RFI in the case that a network operator is licensed to use more than one frequency band.

Figure 4:
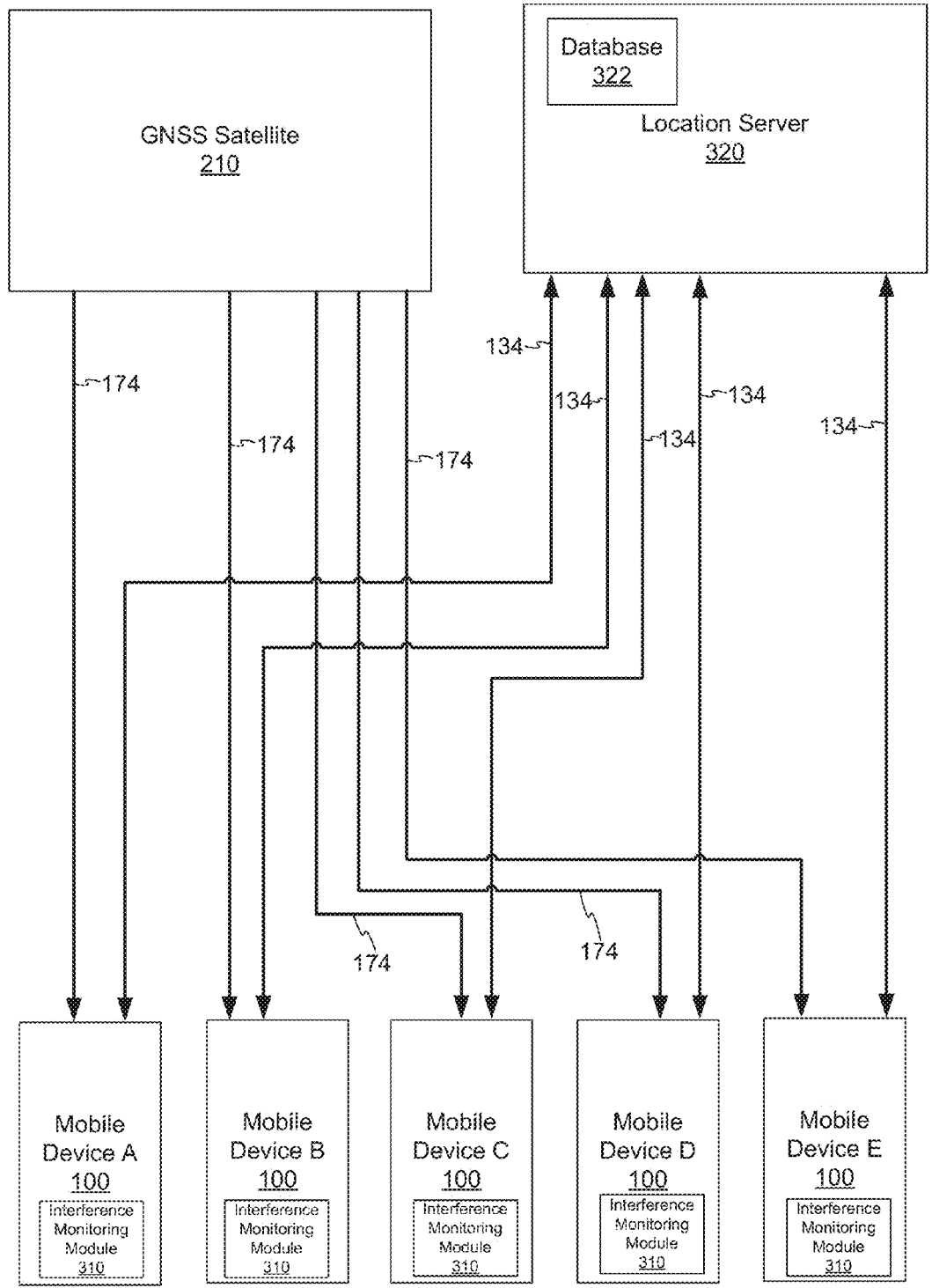
FIG. 4 is a block diagram illustrating an exemplary wireless communication environment wherein a plurality of mobile devices gather RFI awareness assistance data according to some embodiments.

FIG. 4 is a block diagram illustrating an exemplary wireless communication environment wherein a plurality of mobile devices gather RFI awareness assistance data according to some embodiments. The wireless communication environment includes one or more GNSS satellites 210, one or more location servers 320, and a plurality of mobile devices 100. The mobile devices may receive a GNSS signal 174 from the GNSS satellite 210. In some embodiments, the mobile devices 100 may include interference monitoring modules 310. While attempting to determine its location and/or at other times, the mobile devices 100 may encounter RFI. The interference monitoring modules 310 within the mobile devices 100 may be operable to detect the RFI within a service area.

In some embodiments, the location server 320 includes a database 322. The database may be a time and location dependent database of an RFI situation within a service area. The mobile devices 100 may be coupled to the location server 320 and communicate via a wireless signal 134 through one or more network elements (not shown), as required for the particular communications network. Using the location and time dependent RFI situational information of the wireless communication environment, the location server 320 may store a "map" of the RFI situation within the network.

The "map" of the RFI situation may be stored within a database residing in the location server. The "map" may include cell locations, service area locations and/or geographic location coordinates within a wireless communication environment and the corresponding RFI situation for each location. In some embodiments the "map" may be 2-dimensional. In other embodiments, the "map" may have more dimensions (e.g. may include an altitude dimension). The "map" or parts of this "map" may be sent to mobile device 100 and/or to other entities such as a base station 220 or femto cell 230 (not shown in FIG. 4).

The mobile devices 100 may communicate with the location server 320 via a wireless signal 134 through one or more network elements (not shown), as required for the particular communications network. The various mobile devices 100 may gather and report the RFI situational information within the wireless communication environment to the location server 320 for storage in the time and location dependent database 322. This may be an example of "crowd-sourcing." The mobile devices 100 may gather and report the RFI situational information (i) upon request by the location server 320, (ii) following a predetermined periodic time interval (e.g. configured earlier by location server 320 or by a network management entity not shown in FIG. 4), (iii) when a mobile device 100 attempts to use GNSS to obtain its location, and/or (iv) when a mobile device 100 detects that the level of RFI exceeds some threshold. An RFI report from a mobile device 100 to location server 320 may be including as part of GNSS measurements and/or as part of other location measurements when RFI reporting occurs as part of positioning of a mobile device 100 and, in such a case, may be included in a message defined according to a SUPL, RRLP, RRC, LPP, LPPe or IS-801 standard. An RFI report may instead be included in a message associated with support of MDT or SON and, in that case, may initially be sent to some other entity (not shown in FIG. 4) that may later transfer RFI information to location server 320. An RFI report from a mobile device may include: (i) the level and type of RFI detected (e.g. time and frequency characteristics, frequency or frequency band, received signal power or signal-to-noise ratio, spoofing signal information (e.g., PRN code of a spoofer)), (ii) the identity of the mobile device, (iii) the time or times that RFI was detected, (iv) an estimated location for the mobile device at the time of RFI detection, (v) the identity of the current serving cell or serving cells at the time of RFI detection, and/or (vi) the identities of any non-serving cells or WiFi APs detected by the mobile device at the time of RFI detection. An RFI report may also contain an RFI history over a period of time that was stored in a mobile device 100 prior to transfer to location server 320—e.g. may contain items (i), (ii), (iii), (iv), (v) and/or (vi) above as stored by mobile device at periodic time instants over a short time period such as 10 minutes. Reporting an RFI history may reduce the communication burden on a mobile device 100 and/or on a communications network and/or may enable a mobile device 100 to report RFI at a subsequent time if mobile device 100 is initially unable to report RFI due to temporarily being out of network coverage or due to RFI preventing mobile device 100 from initially being able to communicate with a network.

Location server 320 may store RFI situational information received from mobile devices 100 in database 322. Location server 320 may also or instead combine RFI situational information received from mobile devices 100 (e.g. may average certain RFI information (e.g. received signal power level) received from different mobile devices 100 at or near the same locations and for the same or nearly the same time) and/or may defer storage of RFI situational information in database 322 that was received from just a few (e.g. one or two) mobile devices 100 until confirmed by similar RFI situational information received from other mobile devices 100 (and/or from base stations 220 or femto cells 230) at or near the same location.

At some later time, the location server 320 may provide the mobile devices 100 with RFI situational information from the time and location dependent database 322 for the wireless communication environment. As such, one mobile device 100 may receive RFI situational information that was crowd-sourced by other mobile devices 100 within the wireless communication environment and/or was provided to location server 320 by base stations 220 and/or femto cells 230. By using the RFI situational information provided, the mobile devices 100 may adapt a position location measurement according to the received RFI situational information prior to calculating a location of the mobile device.

Figure 5:
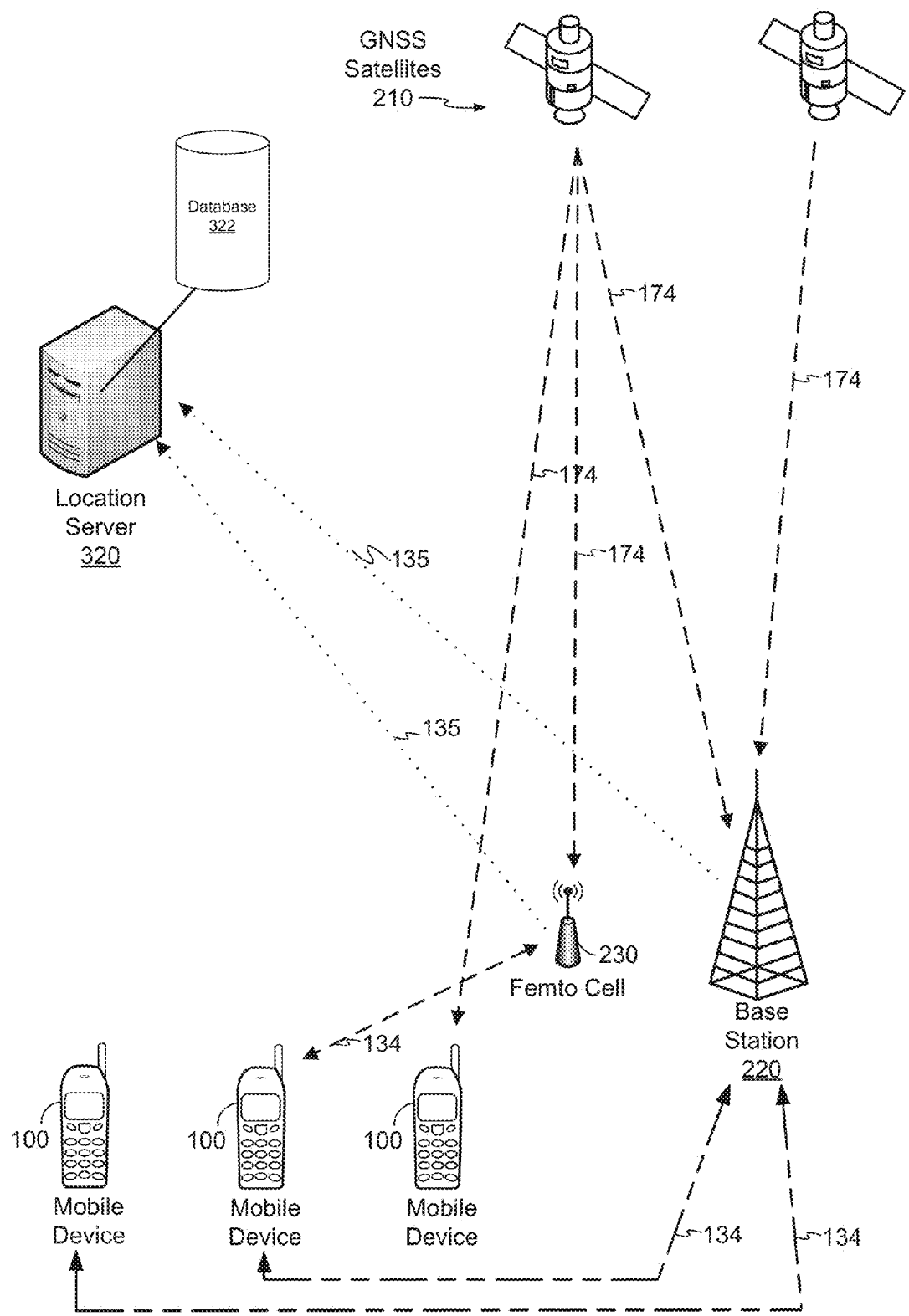
FIG. 5 illustrates an example scenario of gathering RFI awareness assistance data within a wireless communication environment according to some embodiments.

FIG. 5 illustrates an example scenario of gathering RFI awareness assistance data within a wireless communication environment according to some embodiments. FIG. 5 is similar to the block diagram of FIG. 3 and demonstrates an example scenario of the connections involved in gathering the RFI awareness assistance data and using it for location determination of the mobile device 100. The wireless communication environment includes one or more GNSS satellites 210, one or more base stations 220, one or more femto cells 230, one or more mobile devices 100, and one or more location servers 320. The base stations 220 and/or femto cells 230 may receive GNSS signals 174 from the GNSS satellite 210 via a GNSS receiver (not shown) internal to the base stations 220 and/or femto cells 230. The mobile devices 100 may receive and transmit wireless signals 134 to/from the base stations 220 and/or femto cells 230 via a wireless receiver (not shown) internal to the mobile devices 100. The mobile devices 100 may communicate with the base stations 220 and/or femto cells 230 via wireless signals 134 and use the GNSS signals 174 received via a GNSS receiver (not shown) internal to the mobile device for location determination. However, while attempting to determine its location, the mobile device 100 may encounter RFI.

In some embodiments, the location server 320 may include a database 322 operable for storing location and time dependent RFI situational information of the wireless communication environment. Using the location and time dependent RFI situational information of the wireless communication environment, the location server 320 may store a "map" of the RFI situation within the network. The "map" of the RFI situation may be stored within a database residing in the location server. The "map" may include cell locations, service area locations and/or geographic location coordinates within a wireless communication environment and the corresponding RFI situation for each location. In some embodiments the "map" may have more dimensions (e.g. may contain an altitude dimension and be 3-dimensional). The "map" or part of the "map" may be sent to a mobile device 100 and/or a base station 220 and/or a femto cell 230.

In some embodiments, the base stations 220 and/or femto cells 230 may include an interference monitoring module 310. The interference monitoring module 310 may be operable to monitor RFI within the wireless communication environment and gather the RFI situational information. In some embodiments, the interference monitoring module 310 may be internal to the GNSS receiver (not shown) within the base station 220 and/or femto cell 230. The base stations 220 and/or femto cells 230 may report the RFI situational information to the location server 320 via a network communication link or series of communication links 135. In some embodiments, this may occur upon request for the RFI situational information by the location server 320. In another embodiment the base stations 220 and/or femto cells 230 may report the RFI situational information to the location server 320 at a predetermined periodic time interval and/or when the detected level of RFI (e.g. detected signal power level or signal to noise ratio) exceeds some threshold.

The mobile devices 100 may communicate with the location server via a wireless signal 134 through base stations 220 and/or femto cells 230 and/or other network elements (not shown) such as WiFi APs. The location server may provide the mobile devices 100 with RFI situational information from the time and location dependent database 322 for the wireless communication environment. By using the RFI situational information provided, the mobile devices 100 may adapt a position location measurement according to the received RFI situational information prior to calculating a location of the mobile device.

Figure 6:
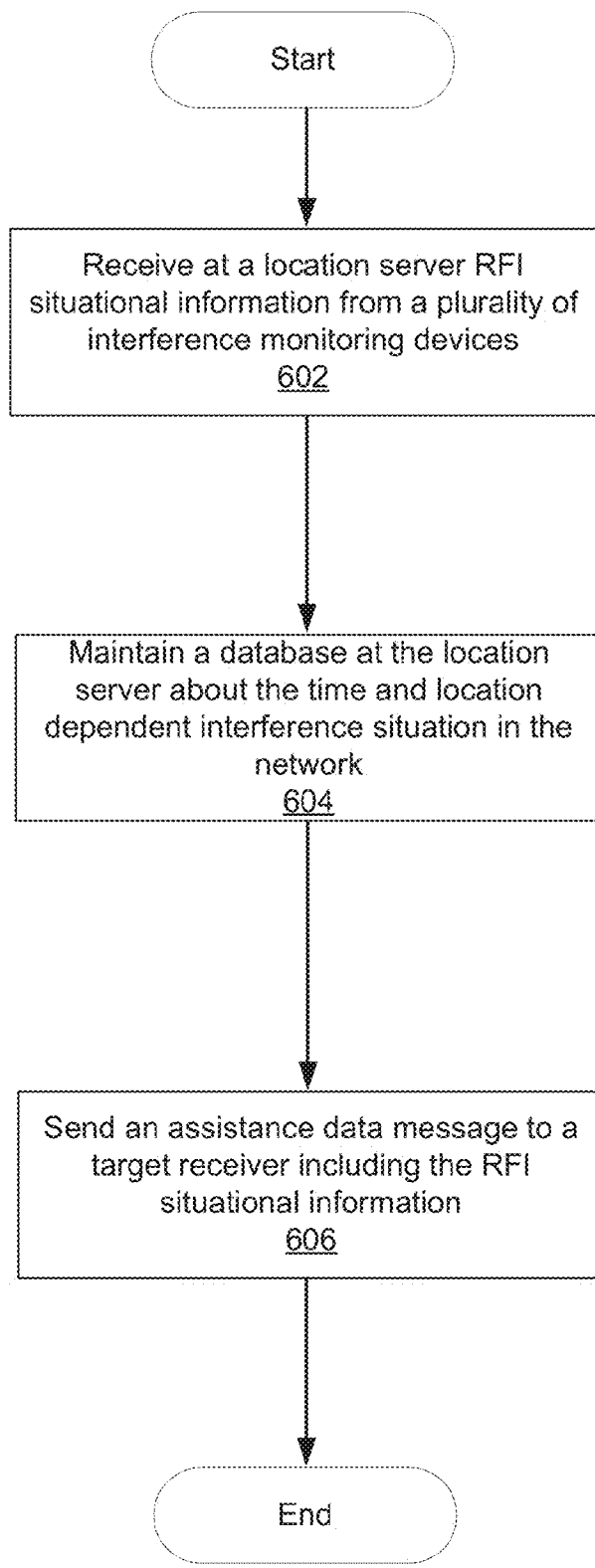
FIG. 6 is a flow diagram illustrating an exemplary embodiment of the invention for sending RFI awareness assistance data to a GNSS receiver according to some embodiments.

FIG. 6 is a flow diagram illustrating an exemplary embodiment of the invention for sending RFI awareness assistance data to a GNSS receiver according to some embodiments. The method of FIG. 6 may be executed by the computer system of FIG. 10 (described later herein). At block 602, a location server (e.g. a location server 320) may receive radio frequency interference information from a plurality of interference monitoring devices. In some embodiments, the radio frequency interference information may be transferred to the location server in messages defined according to a SUPL, RRLP, RRC, LPP, LPPe, LPPa or IS-801 specification. As mentioned above, the interference monitoring devices may be integrated in base station and/or femto cell timing receivers, or may be separate, dedicated interference monitoring stations deployed in the network. The interference monitoring functionality may also be integrated in the mobile stations operating in the network.

The location server may send a message to the interference monitoring stations (e.g., to base stations, femto cells and/or mobile devices) to request the RFI situational information. Such a request may be the request for a single report, for periodic reports, or for event triggered reports (e.g., the interference monitoring function is requested to report new RFI information if the RFI information has changed compared to the previous report or if an RFI power level has exceeded some threshold).

The RFI information provided to the location server may include the time and frequency characteristics of the RFI; e.g., pulsed or continuous interference, frequency or frequency band of the interference, Jammer power or Jammer-to-Noise (J/N) ratio, spoofing signal information (e.g., PRN code of the spoofer), or any other parameter characterizing the particular radio frequency interference type. The RFI information provided may include time and location information, i.e., the time at which the RFI information has been collected and the location (e.g. geographic location or location indicated by a particular network cell) where the RFI information has been measured.

In some cases, a location server may choose not to rely on geographic location to characterize the presence of RFI, since the location may itself have been compromised by the presence of RFI. A location server may then instead choose to characterize the presence (or absence) of RFI using the serving cell areas (or detected WiFi APs) already defined and deployed for a network which may be detected and reported by mobile stations more reliably than geographic location. However, even when a location server chooses to rely more on serving cells areas (or detected WiFi AP identities) to characterize RFI, a location server may still perform a conversion A from the serving cell areas (or WiFi AP identities) into corresponding geographic location coordinates or geographic areas that may then be stored in a database. A location server may also do the reverse and perform a conversion B from any received geographic location coordinates into a corresponding serving cell identify for storage in a database at block 604. Conversion A may be useful when a network supports overlapping cell coverage areas to ensure that RFI situational information reported for a particular serving cell can also be associated with other overlapping cells. Conversion B may be useful when a location server receives a small number of RFI reports at different reported geographic locations within a large rural cell and prefers to associate the reports with the whole cell coverage area rather than just with specific locations within the cell.

At block 604, the location server aggregates all the RFI information reports from the plurality of interference monitoring devices to create a time and location dependent database of the RFI situation in the network. The database may reside within the location server or may be external to but accessible from the location server—e.g. may be stored in a separate network database that may contain other location related assistance data for a network. Using the time and location dependent RFI situational information, the database may store a "map" of the RFI situation within the network.

The "map" of the RFI situation may be stored within a database residing in the location server or external to the location server. The "map" may include cell locations, service area locations and/or geographic location coordinates within a wireless communication environment and the corresponding RFI situation for each location. In some embodiments the "map" may be 2-dimensional. In other embodiments, the "map" may have more dimensions (e.g. may include an altitude dimension). The "map" may be sent to a GNSS receiver within the mobile device or the base station.

At block 606, the location server sends assistance data to a target GNSS receiver (e.g., a mobile device, base station or femto cell). The assistance data may also be sent together with a location request. The location server determines the RFI situational information at the particular time and location from the database generated in block 604, and includes this information in the assistance data message.

It may be appreciated that the RFI situational information may also indicate that there is currently no interference present at the particular location area. The RFI information sent by a location server to a target receiver may include the level of radio interference (e.g. J/N level) for different GNSS signals (e.g. GPS L1, L2, L5) at the expected location of the target receiver. The radio interference information may instead or additionally include the level of radio interference at other locations nearby to or remote from the target receiver. If the location server is able to deduce the probable location and jamming characteristics (e.g. signal transmission power) of a GNSS jammer that is consistent with GNSS radio interference reported by base stations, femto cells, LMUs and/or mobile stations, the location server may also or instead provide the current expected location of the radio jammer, its velocity, if any, and its transmission characteristics (e.g. transmission power and any directionality) to allow a target receiver to calculate for itself the interference levels to be expected at any location.

A location server may also provide an indication to a target receiver as to whether GNSS signals are being jammed or spoofed. In the case of spoofing, a target receiver may choose to disregard any measurements that it makes of GNSS signals that may be spoofed.

A location server may also provide the RFI awareness assistance data in near real-time to target receivers in its service area. For example, if the location server became aware that a jamming/spoofing incident occurred in a particular location area (in block 602), the location server may immediately inform target receivers in the vicinity of the jammer location about the jamming/spoofing attack by sending the RFI awareness assistance data to the target receivers potentially affected by the jammer In some embodiments, the RFI awareness assistance data may be broadcasted by e.g., base stations, and the target receivers in the service area may be informed that the RFI situation has changed in or around the target area location. The target receivers may then be triggered to read the RFI information provided in the broadcast RFI awareness assistance data. In some embodiments, RFI awareness assistance data may be broadcast in a simple form by base stations and/or femto cells—e.g. in a limiting case may be broadcast as a single bit of information to indicate to mobile devices that jamming/spoofing RFI either has or has not been detected in the coverage area of the base station or femto cell. In some embodiments, a base station or femto cell that detects RFI may broadcast information on detection of the RFI to mobile devices in addition to or instead of sending RFI situational reports to a location server. In some embodiments, a mobile device may send RFI situational reports to a serving base station or serving femto cell in addition to or instead of sending RFI situational reports to a location server. A recipient base station or femto cell may then broadcast information related to such received RFI situational reports to other mobile devices and/or may forward the received RFI situational reports to a location server. In some other embodiments in which mobile devices are enabled to signal directly to one another without making use of intermediate network entities such as a base station, femto cell or WiFi AP, a mobile device that detects RFI or is informed that RFI may be present (e.g. due to receiving RFI assistance data sent by a location server or broadcast by a base station or femto cell) may signal or broadcast this information to one or more other mobile devices. The other mobile devices may in turn signal or broadcast the information to yet other mobile devices. Such embodiments may enable mobile devices that are out of network coverage to be informed of RFI—for example in a disaster situation (e.g. hurricane, tornado, earthquake) may assist public safety users who have little or no network coverage.

Figure 7:
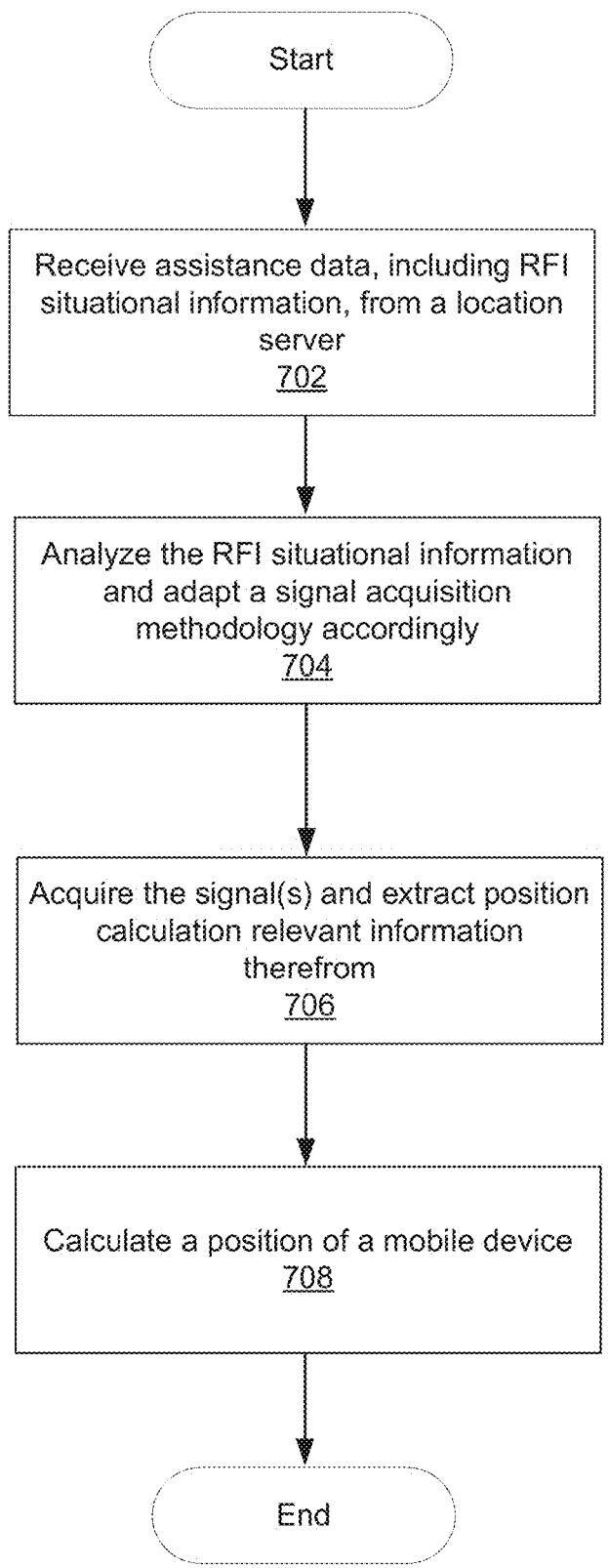
FIG. 7 is a flow diagram illustrating an exemplary embodiment of the invention for receiving RFI awareness assistance data at a GNSS receiver and calculating a position of the receiver according to some embodiments.

FIG. 7 is a flow diagram illustrating an exemplary embodiment of the invention for receiving RFI awareness assistance data at a GNSS receiver and calculating a position of the receiver according to some embodiments. The method of FIG. 7 may be executed by the computer system of FIG. 10. At block 702, a mobile device (e.g. mobile device 100) receives assistance data from a location server (e.g. location server 320) which includes RFI situational information. The assistance data may be transferred in some embodiments in messages defined according to a SUPL, RRLP, RRC, LPP, LPPe or IS-801 specification. At block 704, the mobile device determines based on the received RFI situational information whether RFI is present in the current situation. If RFI is present or may be present, the mobile device takes this information into account when searching for satellite signals.

For example, if the RFI situational information indicates a particular jamming signal power J is present at the current location of the mobile device, the GNSS receiver of the mobile device may adapt the search time for GNSS satellite signals by taking the jamming signal power into account. A measurement for the signal degradation due to RFI in the receiver is the carrier-to-noise density ratio. The theoretical effective carrier-to-noise density ratio $(C/N_o)_{eff}$ is given by:

$$(C/N_o)_{eff} = \frac{1}{\frac{1}{(C/N_o)} + \frac{J/S}{QR_c}}$$

where $$\frac{C}{N_o}$$

is the unjammed carrier-to-noise power ratio
J/S is the jamming-to-received-signal power ratio Q is a dimensionless "jamming resistance quality" factor
$R_c$ is the spreading code chip rate.

Q can be calculated for various interferer types, and for the GPS C/A code Q is given as follows:
Band limited white noise: Q~2.22
Matched spectrum: Q~1.5
Narrowband: Q~1.

A GNSS receiver may know the integration time needed for a given $C/N_o$ value in order to allow reliable detection of the GNSS signal. For example, the receiver may know that in order to acquire a GNSS signal at a particular value of $C/N_o$, an integration time of T seconds is needed. If the assistance data indicates that jamming with power J is present at the current location (together with the type of interference (e.g., band limited white noise, matched spectrum, etc.)), the effective $C/N_o$ is decreased according to the above equation due to the $(J/S)/(QR_c)$ term. Based on the information on how much the effective $C/N_o$ has decreased, the receiver can determine how much more integration time is needed to reliably detect the GNSS signal (e.g., to measure the effective $C/N_o$ as if there were no jamming signal power present). For example, if a 1-second integration time is needed in order to acquire a signal at a $C/N_o$ of 24 dB-Hz, and the effective $C/N_o$ has decreased to 14 dB-Hz due to interference (e.g., as calculated by the (J/S)/(QRc) term in the above equation), the receiver may know that a total integration time of 10-seconds is now needed in order to reliably detect and measure the GNSS signal with the same accuracy and reliability as would have been possible with a 1-second integration time without jamming.

A location server may send the RFI awareness assistance data to a target device together with a request to report location measurements or a location estimate. Such a location request may include a desired or required response time. For example, a target device may be requested to report location measurements within 10 seconds. If the location server is aware that there is RFI present at the current target location (e.g., in the current serving cell for the target), a location server may adapt the response time accordingly; e.g., allow for a longer response time. Alternatively or in addition, a target device may adapt its positioning strategy if a location server provides a response time that cannot be attained using GNSS measurements due to the presence of RFI—e.g. the target device may make use of other non-GNSS position methods such as AFLT or OTDOA in order to attain the requested response time.

Another example of taking the RFI situational information in the received assistance data into account follows. The RFI situational information may indicate that there is significant RFI present at the GPS L1 frequency band. A multi-frequency receiver may then decide not to acquire the GPS L1 signal at all, but instead use the GPS L2 or L5 signal instead for signal acquisition, since assistance data indicates that these signals are not currently jammed.

Another example of taking the RFI situational information in the received assistance data into account follows. The RFI situational information may indicate that there is significant RFI present at all the GPS frequency bands (e.g., L1, L2, and L5). A GPS+GLONASS capable receiver may then decide not to acquire any GPS signal at all, but only acquire the GLONASS signals, since the assistance data indicates that the GLONASS frequency bands are not jammed at the current location.

Another example of taking the RFI situational information in the received assistance data into account follows. The RFI situational information may indicate that there is significant RFI present at all the GNSS frequency bands. In that case, the receiver may decide not to use GNSS for location determination currently, but use instead e.g., OTDOA, AFLT or ECID or any other location method not affected by the RFI for location determination.

At block 706, the target may extract position relevant information (e.g. pseudo-ranges, timing differences) from acquired satellite signals, and/or from acquired non-satellite signals (e.g. signals from base stations, femto cells and/or WiFi APs) which are then used to calculate the target location at block 708. In $_{some}$ embodiments, measurements of acquired signals may be returned to the location server to compute the target location at block 708. In another embodiments, the mobile device may compute its own location using the measurements and possibly additional assistance data provided to the mobile device at block 702 along with the RFI situational information.

In addition to providing static RFI information for a local area or areas to a mobile station as illustrated in FIG. 6 and FIG. 7, a location server may also provide some indication as to how the RFI situation may be changing—e.g. may provide several recent snapshots of RFI information such that a mobile station can infer RFI status at a near future time assuming that a cause of jamming or spoofing is moving. A location server may also provide RFI information to a mobile device for an area that the mobile device is not currently in but may be moving towards—e.g. as determined by the server from recent location history of the mobile device such as current and recent location and velocity and/or from known past location behavior of a mobile device (e.g. such as taking the same route when commuting to or from work each day). Although past location behavior of a mobile device may generally coincide with a user not needing location services (e.g. when commuting to and from work), there may be situations where a user needs to make a detour (e.g. due to traffic problems or to stop off at a shopping mall) and would benefit from accurate and reliable location services and for which RFI information may be useful. Alternatively, a location server could make the inference about future RFI status itself and provide this to a mobile device along with an indication as to the time validity of the information.

A location server may also use its aggregated RFI information (e.g. received from base stations, femto cells, mobile stations, and/or LMUs) to determine when a location estimate or location measurements received from a mobile station may be reliable or unreliable. For example, if a location server can receive some independent reliable indication of the approximate location of a mobile station, such as that based on the serving cell for the mobile station and/or neighboring cells visible to the mobile station, the location server may choose to treat as less reliable any GNSS based location estimate or GNSS measurements provided by the mobile station when the approximate location coincides with an area of known interference. A location server may also use known interference at or near a mobile station location to instruct a mobile station to use only certain GNSS signals for positioning and not others (e.g. use GPS L2 or L5 signals but not L1 signals or use GLONASS but not GPS) and/or to use positioning methods other than GNSS (e.g. may instruct use of OTDOA, AFLT, ECID etc.). Such actions at the location server may not require any special support in a mobile station—e.g. may not require a mobile station to be able to measure and counteract RFI or receive and make use of assistance data from a location server related to the presence of RFI.

In the case where a source of GNSS jamming or spoofing is intermittent or moving quickly, a location server may not be able to pinpoint with any reliability the current local area being affected at any time. In such a case, the location server may issue a warning to mobile stations potentially near the impacted area that RFI may be present. In that case, a mobile station may employ additional resources to attempt to overcome any RFI if present but, if not detected, may continue to support GNSS location normally.

A location server may also infer potential RFI in a particular area without receiving explicit reports from base stations and/or mobile stations when GNSS location in a particular area for a number of mobile stations fails or degrades significantly over a certain time period compared to normal performance at other times. If performance at other times is aggregated and, for example, averaged, a location server may quickly become aware when performance degrades or fails and may react as described above by sending warnings to mobile stations in the area, by instructing mobile stations to use positioning methods other than GNSS and/or by treating GNSS location estimates and/or GNSS measurements obtained by mobile stations in the area with increased caution.

Figure 8:
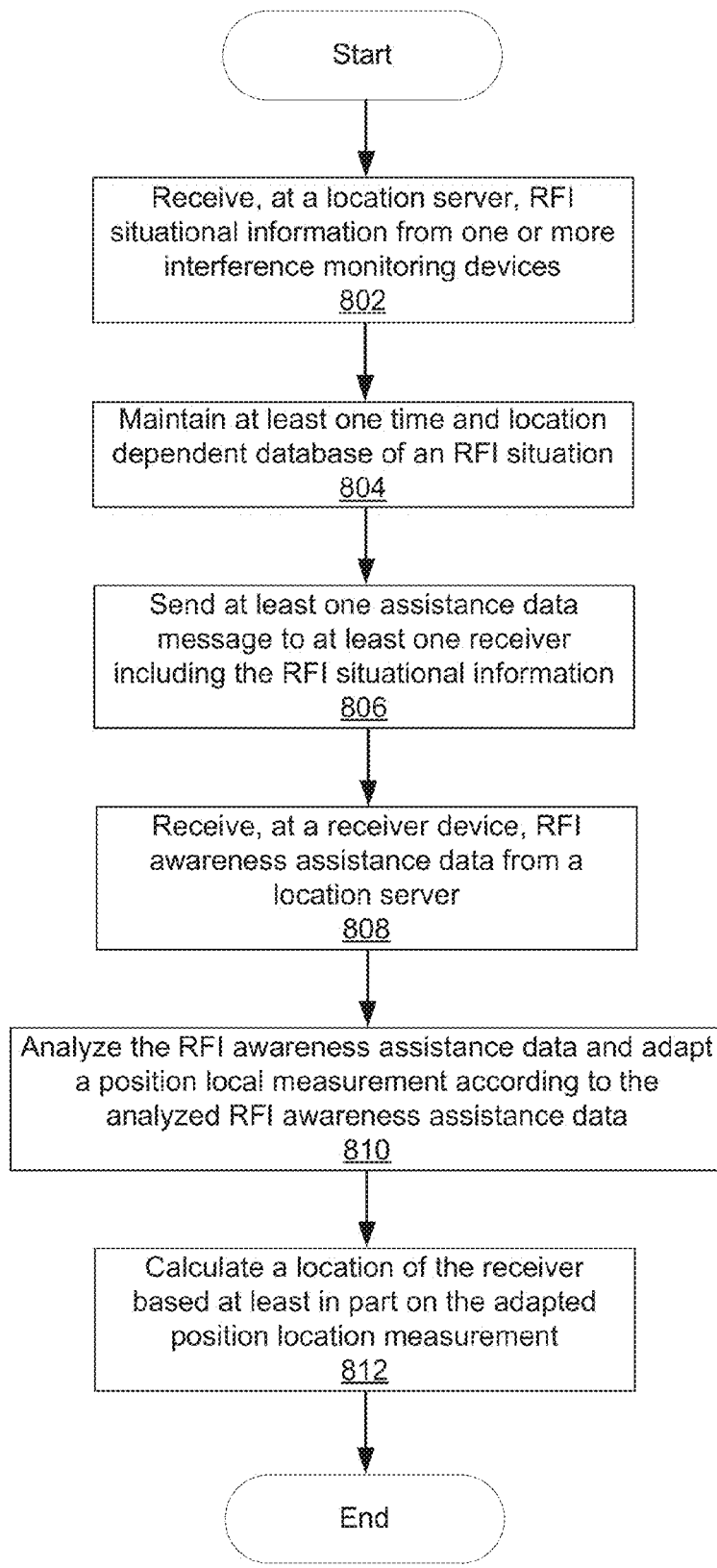
FIG. 8 is a flow diagram illustrating an exemplary embodiment of the invention for gathering RFI awareness assistance data at a location server and sending the RFI awareness assistance to a GNSS receiver prior to calculating a position of the receiver according to some embodiments.

FIG. 8 is a flow diagram illustrating an exemplary embodiment of the invention for gathering RFI awareness assistance data at a location server and sending the RFI awareness assistance to a GNSS receiver prior to calculating a position of the receiver according to some embodiments. The method of FIG. 8 is similar to the combined methods of FIG. 6 and FIG. 7. The method of FIG. 8 may be executed by the computer system of FIG. 10. In block 802, RFI situational information is received at a location server (e.g. location server 320) from one or more interference monitoring devices. As mentioned above, the interference monitoring devices may be integrated in the base stations (e.g. base stations 220) and/or femto cells (e.g. femto cells 230), or may be separate, dedicated interference monitoring stations deployed in the network. The interference monitoring functionality may also be integrated in the mobile stations (e.g. mobile stations 100) operating in the network.

In block 804, at least one time and location dependent database (e.g. database 322) of an RFI situation is maintained. The time and location dependent database may be located within a location server (e.g. location server 320) or may be external to but accessible by a location server. Using the time and location dependent RFI situational information, the database may store a "map" of the RFI situation within a network coverage area. In some embodiments, the time and location dependent database may be stored in the location server of FIG. 3.

In block 806, at least one assistance data message is sent to at least one receiver including the RFI situational information. In some embodiments, the receiver may be a mobile device. In another embodiment, the receiver may be a base station or femto cell. The assistance data may also be sent together with a location request. The location server determines the RFI situational information for the current time and at the current location (or approximate current location) of the receiver from the database generated in block 804, and includes this information in the assistance data message. For example, in FIG. 5, the location server may send RFI awareness assistance data to the number of mobile devices. The assistance data message may be defined according to LPPa when the receiver is a base station or femto cell (e.g. a base station or femto cell supporting LTE) or may be defined according to SUPL, RRLP, RRC, LPP, LPPe or IS-801 when the receiver is a mobile device.

In block 808, the RFI awareness assistance sent by the location server (block 806) is received at a receiver device. In block 810, the RFI awareness assistance data received at the receiver device is analyzed and a position location measurement is adapted according to the analyzed RFI awareness assistance data. If RFI is present, the mobile device takes this information into account when searching for satellite signals and/or when deciding whether to search for satellite signals or use a non-satellite method of location such as OTDOA or AFLT. For example, in FIG. 5, the mobile devices may receive the RFI awareness assistance data sent by the location server.

In some embodiments, the receiver device may extract position relevant information, such as pseudo-ranges or timing differences, from acquired satellite and/or non-satellite signals, which are then used to calculate the target location at block 812—either at the receiver device or at the location server if signal measurements are returned to the location server.

FIG. 9 illustrates exemplary RFI awareness assistance data 900 according to some embodiments. The RFI awareness assistance data 900 may be stored within database 322 (FIG. 5) of location server 320 (FIG. 5). Further, the RFI awareness assistance data 900 may be collected by a plurality of mobile devices 100 (FIG. 2A) and/or base stations 220 (FIG. 2A) and/or femto cells 230 (FIG. 2A). It can be appreciated that while FIG. 9 illustrates three instances of RFI awareness data 900, the data 322 (FIG. 5) may contain any number of instances of gathered RFI awareness data 900.

The RFI awareness assistance data 900 includes information about the RFI power 910, RFI power-to-noise ratio (J/N) 920, RFI PRN code number 930, RFI frequency 940, RFI location 950, and RFI type 960. Some or all of these pieces of RFI awareness assistance data 900 information may be used by a GNSS receiver to adapt a position location measurement and calculate a location of the receiver based on the measurement.

The RFI power 910 provides information about how strong or weak RFI may be within a particular service area. The RFI power-to-noise ratio (J/N) 912 provides the ratio of the RFI power to the noise within the particular service area. The greater the RFI power to noise ratio the greater the amount of RFI within the particular service area. The RFI PRN Code Number 930 indicates spoofing signal information, e.g., the PRN code of the spoofing devices. The RFI Frequency 940 indicates the frequency at which the RFI has been detected. The RFI location 950 indicates the cellular area (service area) at which the RFI has been detected. The RFI type 960 indicates the particular type of RFI that was detected. The RFI types may include, but are not limited to, broadband, narrowband, continuous wave (CW) tone, pulsed interference with a certain duty cycle, band limited white noise, and matched spectrum. In some embodiments, the RFI type may be used for determining the "jamming resistance quality" factor, described above.

In some embodiments, the RFI location 950 may include a geographic location to characterize the presence of RFI, e.g. the longitude and latitude of a single point or the description of a geographic area such as circle with a given radius and given center latitude and longitude. However, at times the geographic location (e.g. if provided by a mobile device) may have been compromised by the presence of RFI. Thus, the RFI awareness assistance data 900 may in addition or instead characterize the presence of RFI using serving cell areas already defined and deployed for a network which may be detected and reported by mobile devices or base stations more reliably than geographic locations. The Cell Area may be reported as a geographic location (e.g., longitude and latitude) together with an uncertainty circle or other uncertainty area (ellipse, polygon, etc.).

The location server may send the RFI awareness assistance data 900 to a target GNSS receiver (e.g., a mobile device, base station or femto cell). The assistance data may also be sent together with a location request.

It can be appreciated that the RFI situational information may also indicate that there is currently no interference present at the particular location area. The RFI awareness assistance data 900 sent by a location server to a target receiver may include the level of radio interference 920 (e.g. J/N level) for different GNSS signal frequencies 940 (e.g. GPS L1, L2, L5) at the expected location of the target receiver. The radio interference information may instead or additionally include the level of radio interference 920 at other locations nearby to or remote from the target receiver. If the location server is able to deduce the probable location and jamming characteristics (e.g. signal transmission power 910) of a GNSS jammer that is consistent with GNSS radio interference reported by base stations, femto cells, LMUs and/or mobile stations, the location server may also or instead provide the current expected location 950 of the radio jammer, its velocity, if any, and its transmission characteristics (e.g. transmission power 910 and any directionality) to allow a target receiver to calculate for itself the interference levels to be expected at any location.

All of the embodiments described above may be practiced in such systems such as a computer system.

Figure 10:
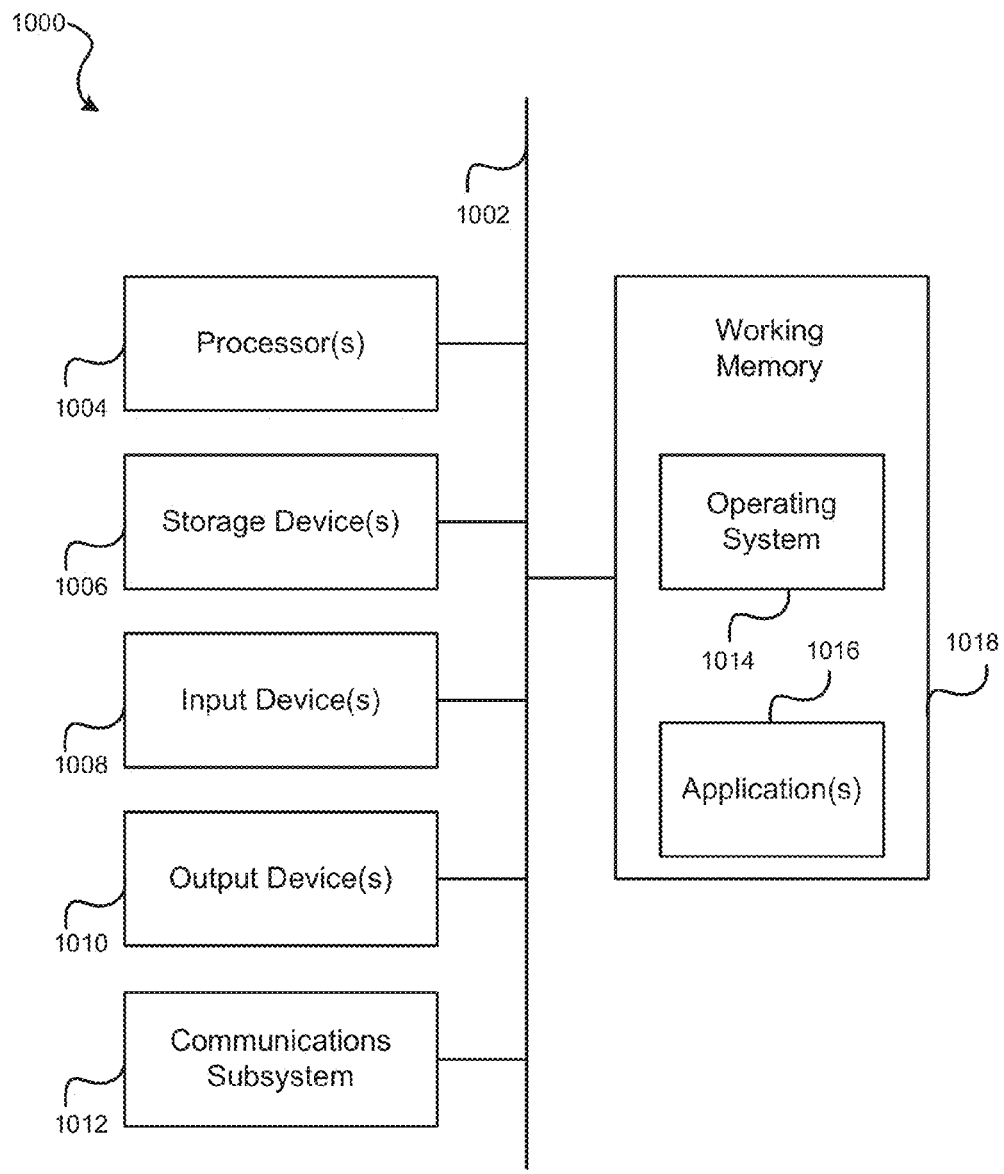
FIG. 10 illustrates an exemplary computer system incorporating parts of the device employed in practicing some embodiments.

FIG. 10 illustrates an exemplary computer system incorporating parts of the device employed in practicing embodiments of the invention according to some embodiments. A computer system as illustrated in FIG. 10 may be incorporated as part of the above described computerized device. The location server 310 of FIG. 3 may be implemented using the computer system 1000 and the computer system may execute the methods described in FIGS. 6-8. Further, a base station 220 of FIGS. 2A, 2B and 3 and/or a femto cell 230 of FIGS. 2A, 2B and 3 may be implemented using the computer system 1000.

For example, computer system 1000 may represent some of the components of a mobile device (e.g. mobile device 100), a server, a desktop, a workstation, a control or interaction system in an automobile, a tablet, a netbook or any other suitable computing system. A mobile device may be any computing device with an image capture device or input sensory unit and a user output device. A user output device may be a display unit. Examples of a mobile device include but are not limited to video game consoles, tablets, smart phones and any other hand-held devices. In some instances, a mobile device may have no user input or output capability or only very limited such capability—e.g. may be a tracking device carried by or attached to a user or some moveable object like a vehicle or other valuable asset. FIG. 10 provides a schematic illustration of some embodiments of a computer system 1000 that can perform the methods provided by various other embodiments, as described herein, and/or can function as the host computer system, a remote kiosk/terminal, a point-of-sale device, a telephonic or navigation or multimedia interface in an automobile, a mobile device, a set-top box, a table computer and/or a computer system. FIG. 10 is meant only to provide a generalized illustration of various components, any or all of which may be utilized as appropriate and some of which may not always be present. FIG. 10, therefore, broadly illustrates how individual system elements may be implemented in a relatively separated or relatively more integrated manner.

The computer system 1000 is shown comprising hardware elements that can be electrically coupled via a bus 1002 (or may otherwise be in communication, as appropriate). The hardware elements may include one or more processors 1004, including without limitation one or more general-purpose processors and/or one or more special-purpose processors (such as digital signal processing chips, graphics acceleration processors, and/or the like); one or more input devices 1008, which can include without limitation one or more cameras, sensors, a mouse, a keyboard, a microphone configured to detect ultrasound or other sounds, and/or the like; and one or more output devices 1010, which can include without limitation a display unit such as the device used in embodiments of the invention, a printer and/or the like. In some implementations, input devices 1008 may include one or more sensors such as infrared and ultrasound sensors.

In some implementations of the embodiments of the invention, various input devices 1008 and output devices 1010 may be embedded into interfaces such as display devices, tables, floors, walls, and window screens. Furthermore, input devices 1008 and output devices 1010 coupled to the processors may form multi-dimensional tracking systems.

The computer system 1000 may further include (and/or be in communication with) one or more non-transitory storage devices 1006, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1000 might also include a communications subsystem 1012, which can include without limitation a modem, a network card (wireless or wired), an infrared communication device, a wireless communication device and/or chipset (such as a Bluetooth™ device, an 802.11 device, a WiFi device or WiFi AP, a WiMax device, cellular communication facilities, etc.), and/or the like. The communications subsystem 1012 may permit data to be exchanged with a wireless and/or wireline network, other computer systems, and/or any other devices described herein. Communications system 1012 may be coupled to one or more antennas (not shown in FIG. 10) for the purpose of receiving and transmitting radio signals. Communications system 1012 may enable the reception, detection and measurement of GNSS signals and may then comprise part or all of a GNSS receiver. In many embodiments, the computer system 1000 will further comprise a non-transitory working memory 1018, which can include a RAM or ROM device, as described above.

The computer system 1000 also can comprise software elements, shown as being currently located within the working memory 1018, including an operating system 1014, device drivers, executable libraries, and/or other code, such as one or more application programs 1016, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1006 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some embodiments, one or more elements of the computer system 1000 may be omitted or may be implemented separate from the illustrated system. For example, the processor 1004 and/or other elements may be implemented separate from the input device 1008. In some embodiments, elements in addition to those illustrated in FIG. 10 may be included in the computer system 1000.

Some embodiments may employ a computer system (such as the computer system 1000) to perform methods in accordance with the disclosure. For example, some or all of the procedures of the described methods may be performed by the computer system 1000 in response to processor 1004 executing one or more sequences of one or more instructions (which might be incorporated into the operating system 1014 and/or other code, such as an application program 1016) contained in the working memory 1018. Such instructions may be read into the working memory 1018 from another computer-readable medium, such as one or more of the storage device(s) 1006. Merely by way of example, execution of the sequences of instructions contained in the working memory 1018 might cause the processor(s) 1004 to perform one or more procedures of the methods described herein.

The terms "machine-readable medium" and "computer-readable medium," as used herein, refer to any medium that participates in providing data that causes a machine to operate in a specific fashion. In some embodiments implemented using the computer system 1000, various computer-readable media might be involved in providing instructions/code to processor(s) 1004 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1006. Volatile media include, without limitation, dynamic memory, such as the working memory 1018. Transmission media include, without limitation, coaxial cables, copper wire and fiber optics, including the wires that comprise the bus 1002, as well as the various components of the communications subsystem 1012 (and/or the media by which the communications subsystem 1012 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1004 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the invention.

The communications subsystem 1012 (and/or components thereof) generally will receive the signals, and the bus 1002 then might carry the signals (and/or the data, instructions, etc. carried by the signals) to the working memory 1018, from which the processor(s) 1004 retrieves and executes the instructions. The instructions received by the working memory 1018 may optionally be stored on a non-transitory storage device 1006 either before or after execution by the processor(s) 1004.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figures.

Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Thus, in the description above, functions or methods that are described as being performed by the computer system may be performed by a processor—for example, the processor 1004—configured to perform the functions or methods. Further, such functions or methods may be performed by a processor executing instructions stored on one or more computer readable media.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method of supporting location of a mobile device, comprising:
   receiving at a location server radio frequency interference (RFI) situational information pertaining to an RFI situation for at least one Global Navigation Satellite System (GNSS), wherein the RFI situational information comprises information about at least one of:
      time and frequency characteristics of an RFI of the RFI situation;
      a power of the RFI;
      a power-to-noise ratio of the RFI; or
      a pseudorandom noise (PRN) code number of the RFI;
   maintaining, within a database, at least one time and location dependent map of the RFI situation; and
   sending assistance data to the mobile device including the RFI situational information and at least a portion of the at least one time and location dependent map of the RFI situation.

2. The method of claim 1, wherein the assistance data comprises one or more of indications about changes in the RFI situation and indications about a presence of spoofing.

3. The method of claim 1, wherein the RFI situational information is received by a location server from one or more interference monitoring devices.

4. The method of claim 1, wherein the sending assistance data to the mobile device further comprises broadcasting the RFI situational information to a plurality of receivers.

5. The method of claim 1, further comprising sending a location request to the mobile device.

6. The method of claim 1, wherein the at least one time and location dependent map comprises at least one of cell locations, service area locations, or geographic location coordinates within a wireless communication environment and a corresponding RFI situation for each location.

7. An apparatus, comprising:
   a processor coupled to a database;
   wherein the processor is configured to receive radio frequency interference (RFI) situational information pertaining to an RFI situation, wherein the RFI situational information comprises information about at least one of:
      time and frequency characteristics of an RFI of the RFI situation;
      a power of the RFI;
      a power-to-noise ratio of the RFI; or
      a pseudorandom noise (PRN) code number of the RFI;
   wherein the processor is configured to maintain, within the database, at least one time and location dependent map of the RFI situation; and
   wherein the processor is configured to send at least one assistance data message to at least one receiver including the RFI situational information and at least a portion of the at least one time and location dependent map of the RFI situation.

8. The apparatus of claim 7, wherein the assistance data message comprises one or more of indications about changes in the RFI situation and indications about a presence of spoofing.

9. The apparatus of claim 7, wherein the RFI situational information is received by the processor from one or more interference monitoring devices.

10. The apparatus of claim 7, wherein the processor is further configured to broadcast the RFI situational information to a plurality of receivers.

11. The apparatus of claim 7, wherein the processor is further configured to send a location request to the receiver.

12. The apparatus of claim 7, wherein the at least one time and location dependent map comprises at least one of cell locations, service area locations, or geographic location coordinates within a wireless communication environment and a corresponding RFI situation for each location.

13. An apparatus, comprising:
   means for receiving radio frequency interference (RFI) situational information pertaining to an RFI situation, wherein the RFI situational information comprises information about at least one of:
      time and frequency characteristics of an RFI of the RFI situation;
      a power of the RFI;
      a power-to-noise ratio of the RFI; or
      a pseudorandom noise (PRN) code number of the RFI;
   means for maintaining, within a database, at least one time and location dependent map of the RFI situation; and
   means for sending at least one assistance data message to at least one receiver including the RFI situational information and at least a portion of the at least one time and location dependent map of the RFI situation.

14. The apparatus of claim 13, wherein the assistance data message comprises one or more of indications about changes in the RFI situation and indications about a presence of spoofing.

15. The apparatus of claim 13, wherein the RFI situational information is received by a location server from one or more interference monitoring devices.

16. The apparatus of claim 13, further comprising means for broadcasting the RFI situational information to a plurality of receivers.

17. The apparatus of claim 13, further comprising means for sending a location request to the receiver.

18. The apparatus of claim 13, wherein the at least one time and location dependent map comprises at least one of cell locations, service area locations, or geographic location coordinates within a wireless communication environment and a corresponding RFI situation for each location.

19. A computer program product residing on a non-transitory processor-readable medium and comprising processor-readable instructions configured to cause a processor to:

receive radio frequency interference (RFI) situational information pertaining to an RFI situation, wherein the RFI situational information comprises information about at least one of:
- time and frequency characteristics of an RFI of the RFI situation;
- a power of the RFI;
- a power-to-noise ratio of the RFI; or
- a pseudorandom noise (PRN) code number of the RFI;

maintain, within a database, at least one time and location dependent map of the RFI situation; and send at least one assistance data message to at least one receiver including the RFI situational information and at least a portion of the at least one time and location dependent map of the RFI situation.

20. The computer program product of claim 19, wherein the assistance data message comprises one or more of indications about changes in the RFI situation and indications about a presence of spoofing.

21. The computer program product of claim 19, wherein the RFI situational information is received by a location server from one or more interference monitoring devices.

22. The computer program product of claim 19, wherein the instructions are further configured to broadcast the RFI situational information to a plurality of receivers.

23. The computer program product of claim 19, wherein the instructions are further configured to send a location request to the receiver.

24. The computer program product of claim 19, wherein the at least one time and location dependent map comprises at least one of cell locations, service area locations, or geographic location coordinates within a wireless communication environment and a corresponding RFI situation for each location.

25. A method of supporting location at a mobile device, comprising:
receiving radio frequency interference (RFI) awareness assistance data from a location server for at least one Global Navigation Satellite System (GNSS) system, wherein the RFI awareness assistance data comprises at least a portion of a time and location dependent map of an RFI situation, and wherein the RFI awareness assistance data comprises RFI situational information comprising information about at least one of:
- time and frequency characteristics of an RFI of the RFI situation;
- a power of the RFI;
- a power-to-noise ratio of the RFI; or
- a pseudorandom noise (PRN) code number of the RFI;

adapting a position location measurement according to the received RFI awareness assistance data; and calculating a location of the mobile device based at least in part on the adapted position location measurement.

26. The method of claim 25, wherein the adapting further comprises:
analyzing the received RFI awareness assistance data and adapting a signal(s) acquisition method based at least in part on the analyzing; and
acquiring the signal(s) based on the signal acquisition method and extracting information relevant to calculating the location.

27. The method of claim 26, wherein adapting the signal(s) acquisition method further comprises selecting a GNSS frequency band, employing an algorithm(s) to mitigate RFI, acquiring a GNSS signal without interference, or acquiring a non-GNSS based signal.

28. The method of claim 25, wherein the RFI awareness assistance data is received by the mobile device.

29. The method of claim 25, further comprising responding to a location request by the location server.

30. The method of claim 25, wherein the time and location dependent map comprises at least one of cell locations, service area locations, or geographic location coordinates within a wireless communication environment and a corresponding RFI situation for each location.

31. An apparatus, comprising:
a processor coupled to a wireless receiver;
wherein the wireless receiver is configured to receive radio frequency interference (RFI) awareness assistance data from a location server, wherein the RFI awareness assistance data comprises at least a portion of a time and location dependent map of an RFI situation, and wherein the RFI awareness assistance data comprises RFI situational information comprising information about at least one of:
- time and frequency characteristics of an RFI of the RFI situation;
- a power of the RFI;
- a power-to-noise ratio of the RFI; or
- a pseudorandom noise (PRN) code number of the RFI;

wherein the processor is configured to adapt a position location measurement according to the received RFI awareness assistance data; and wherein the processor is configured to calculate a location of the receiver based at least in part on the adapted position location measurement.

32. The apparatus of claim 31, wherein the adapting further comprises:
analyzing the received RFI awareness assistance data and adapting a signal(s) acquisition method based at least in part on the analyzing; and
acquiring the signal(s) based on the signal acquisition method and extracting information relevant to calculating the location.

33. The apparatus of claim 32, wherein adapting the signal(s) acquisition method further comprises selecting a Global Navigation Satellite System (GNSS) frequency band, employing an algorithm(s) to mitigate an RFI of the RFI situation, acquiring a GNSS signal without interference, or acquiring a non-GNSS based satellite navigation system signal.

34. The apparatus of claim 31, wherein the RFI awareness assistance data is received by the wireless receiver.

35. The apparatus of claim 31, wherein the processor is further configured to respond to a location request by the location server.

36. The apparatus of claim 31, wherein the time and location dependent map comprises at least one of cell locations, service area locations, or geographic location coordinates within a wireless communication environment and a corresponding RFI situation for each location.

37. An apparatus, comprising:
means for receiving, at a receiver device, radio frequency interference (RFI) awareness assistance data from a location server, wherein the RFI awareness assistance data comprises at least a portion of a time and location dependent map of an RFI situation, and wherein the RFI awareness assistance data comprises RFI situational information comprising information about at least one of:
- time and frequency characteristics of an RFI of the RFI situation;
- a power of the RFI;

a power-to-noise ratio of the RFI; or a pseudorandom noise (PRN) code number of the RFI;

means for adapting a position location measurement according to the received RFI awareness assistance data; and means for calculating a location of the receiver device based at least in part on the adapted position location measurement.

38. The apparatus of claim 37, wherein the means for adapting further comprises:

means for analyzing the received RFI awareness assistance data and means for adapting a signal(s) acquisition method based at least in part on the means for analyzing; and means for acquiring the signal(s) based on the signal acquisition method and means for extracting information relevant to calculating the location.

39. The apparatus of claim 38, wherein the means for adapting the signal(s) acquisition method further comprises means for selecting a global navigation satellite system (GNSS) frequency band, means for employing an algorithm(s) to mitigate an RFI of the RFI situation, means for acquiring a GNSS signal without interference, or means for acquiring a non-GNSS based satellite navigation system signal.

40. The apparatus of claim 37, wherein the RFI awareness assistance data is received by the receiver device.

41. The apparatus of claim 37, further comprising means for responding to a location request by the location server.

42. The apparatus of claim 37, wherein the time and location dependent map comprises at least one of cell locations, service area locations, or geographic location coordinates within a wireless communication environment and a corresponding RFI situation for each location.

43. A computer program product residing on a non-transitory processor-readable medium and comprising processor-readable instructions configured to cause a processor to:

receive, at a receiver device coupled to the processor, radio frequency interference (RFI) awareness assistance data from a location server, wherein the RFI awareness assistance data comprises at least a portion of a time and location dependent map of an RFI situation, and wherein the RFI awareness assistance data comprises RFI situational information comprising information about at least one of:

time and frequency characteristics of an RFI of the RFI situation;

a power of the RFI;

a power-to-noise ratio of the RFI; or a pseudorandom noise (PRN) code number of the RFI;

adapt a position location measurement according to the received RFI awareness assistance data; and calculate a location of the receiver device based at least in part on the adapted position location measurement.

44. The computer program product of claim 43, wherein the adapting further comprises:

analyzing the received RFI awareness assistance data and adapting a signal(s) acquisition method based at least in part on the analyzing; and acquiring the signal(s) based on the signal acquisition method and extracting information relevant to calculating the location.

45. The computer program product of claim 44, wherein adapting the signal(s) acquisition method further comprises selecting a global navigation satellite system (GNSS) frequency band, employing an algorithm(s) to mitigate an RFI of the RFI situation, acquiring a GNSS signal without interference, or acquiring a non-GNSS based signal.

46. The computer program product of claim 43, wherein the RFI awareness assistance data is received by the receiver device.

47. The computer program product of claim 43, wherein the instructions are further configured to respond to a location request by the location server.

48. The computer program product of claim 43, wherein the time and location dependent map comprises at least one of cell locations, service area locations, or geographic location coordinates within a wireless communication environment and a corresponding RFI situation for each location.

* * * * *